US009260579B2

(12) United States Patent
Cobb et al.

(10) Patent No.: US 9,260,579 B2
(45) Date of Patent: Feb. 16, 2016

(54) MIXED TANNIN-PHENOLIC FOAMS

(75) Inventors: Michael W Cobb, Wilmington, DE (US); Mark Andrew Harmer, Landenberg (GB); Vivek Kapur, Kennett Square, PA (US); Ann Y Liauw, Wilmington, DE (US); Sharlene Renee Williams, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/118,940

(22) PCT Filed: May 25, 2012

(86) PCT No.: PCT/US2012/039747
§ 371 (c)(1),
(2), (4) Date: Nov. 20, 2013

(87) PCT Pub. No.: WO2012/162681
PCT Pub. Date: Nov. 29, 2012

(65) Prior Publication Data
US 2014/0093720 A1  Apr. 3, 2014

Related U.S. Application Data

(60) Provisional application No. 61/489,847, filed on May 25, 2011, provisional application No. 61/489,854, filed on May 25, 2011, provisional application No. 61/489,787, filed on May 25, 2011, provisional application No. 61/489,790, filed on May 25, 2011, provisional application No. 61/489,795, filed on May 25, 2011, provisional application No. 61/489,803, filed on May 25, 2011, provisional application No. 61/489,807, filed on May 25, 2011.

(51) Int. Cl.
*C08J 9/14* (2006.01)
*C08J 9/00* (2006.01)
*B32B 5/18* (2006.01)

(52) U.S. Cl.
CPC . *C08J 9/146* (2013.01); *B32B 5/18* (2013.01); *C08J 9/0061* (2013.01); *C08J 9/14* (2013.01); *C08J 2203/162* (2013.01); *C08J 2361/06* (2013.01); *C08J 2497/00* (2013.01); *C08J 2499/00* (2013.01); *Y10T 428/249976* (2015.04)

(58) Field of Classification Search
CPC ............ C08J 9/0061; C08J 9/14; C08J 9/146; C08J 2203/162; C08J 2361/06; C08J 2497/00; C08J 2499/00; B32B 5/18; Y10T 428/249976
See application file for complete search history.

(56) References Cited

U.S. PATENT DOCUMENTS

| | | | |
|---|---|---|---|
| 2009/0214853 A1* | 8/2009 | Quist et al. | 428/319.1 |
| 2010/0010111 A1 | 1/2010 | Coppock et al. | |
| 2010/0280141 A1 | 11/2010 | Loh et al. | |
| 2014/0193322 A1* | 7/2014 | Celzard et al. | 423/445 R |

FOREIGN PATENT DOCUMENTS

| | | | |
|---|---|---|---|
| DE | 2625811 A1 | | 12/1976 |
| GB | 1544411 A | | 4/1979 |
| JP | 05179043 A | * | 7/1993 |

OTHER PUBLICATIONS

Meikleham, N. E. et al., Acid- and Alkali-Catalyzed Tannin-Based Rigid Foams, Journal of Applied Polymer Science, 1994, pp. 1547-1556, vol. 53.
Link, Martin et al., Formaldehyde-Free Tannin-Based Foams and Their Use As Lightweight Panels, BioResources, 2011, pp. 4218-4228, vol. 6, No. 4.
Pizzi, A. et al., Matrix-Assisted Laser Desorption/Ionization Time-of-Flight Structure Determination of Complex Theromset Networks: Polyflavonoid Tannin-Furanic Rigid Foams, Journal of Applied Polymer Science, 2008, pp. 1451-1456, vol. 110.
Zhao, W. et al., Effect of composition and processing parameters on the characteristics of tannin-based rigid foams. Part I: Cell structure, Materials Chemistry and Physics, 2010, pp. 175-182, vol. 122.
Zhao, W et al., Effect of composition and processing parameters on the characteristics of tannin-based rigid foams. Part II: Physical Properties, Materials Chemistry and Physics, 2010, pp. 210-217, vol. 123.
Pizzi, A., Tannin-Based Neutral and Alkaline Phenolic-Type Foams, Journal of Applied Polymer Science, 1979, pp. 1901-1905, vol. 23.
Tondi, G. et al., Tannin-based carbon foams, Carbon, 2009, pp. 1480-1492, vol. 47.
Tondi, G. et al., Tannin-based rigid foams: A survey of chemical and physical properties, Bioresource Technology, 2009, pp. 5162-5169, vol. 100.
Tondi, G. et al., Natural Tannin-Based Rigid Foams as Insulation for Doors and Wall Panels, Maderas. Ciencia y Tecnologia, 2008, pp. 219-227.
Tondi, G. et al., Tannin-based rigid foams: Characterization and modification, Industrial Crops and Products, 2009, pp. 356-363, vol. 29.
Tondi, G. et al., X-Ray Microtomography Studies of Tannin-Derived Organic and Carbon Foams, Microscopy and Microanalysis, 2009, pp. 384-394, vol. 15.

* cited by examiner

*Primary Examiner* — Irina S Zemel

(57) ABSTRACT

Disclosed are foam compositions and processes to form mixed tannin-phenolic foams. The foams comprises a continuous polymeric phase defining a plurality of cells, wherein the continuous polymeric phase comprises a mixed-resin derived from a phenol, a tannin, and a first monomer, and wherein the plurality of cells comprises a plurality of open-cells and a plurality of closed-cells with an open-cell content measured according to ASTM D6226-5, of less than 50%. The foam composition also comprises a discontinuous phase disposed in at least a portion of the plurality of closed-cells, the discontinuous phase comprising one or more blowing agents.

15 Claims, No Drawings

MIXED TANNIN-PHENOLIC FOAMS

This application claims benefit under 35 U.S.C. §119(e) of U.S. Provisional Patent Application Nos. 61/489,854; 61/489,787; 61/489,790; 61/489,795; 61/489,803; 61/489,847; and 61/489,807 filed on May 25, 2011, which are herein incorporated by reference.

FIELD OF THE INVENTION

This invention relates in general to mixed tannin-phenolic foams and in particular to compositions and processes for producing closed-cell mixed tannin-phenolic foams.

BACKGROUND INFORMATION

Due to depleting world energy resources and global warming, there is a drive to improve energy efficiency of new and existing commercial and residential buildings. One of the strategies is to improve thermal insulation around the buildings. Currently, the building industry uses several different forms of insulation materials, for example, glass fibers and mineral fibers. However, glass and mineral fibers exhibit high thermal conductivity in the range of 0.03-0.04 W/m·K. In comparison, aerogels exhibit thermal conductivity in the range of 0.008-0.012 W/m·K, but aerogels are very fragile and lack the mechanical strength needed for thermal insulation for building applications.

Apart from fibrous insulation, certain types of polymeric foams are commonly used for insulation applications that exhibit thermal conductivity in between those of glass fibers and aerogel materials. Only foams that are blown from low thermal conductivity blowing agents and result in a predominantly closed cell structures, with significant fraction of the blowing agent trapped within the closed cells, can exhibit low thermal conductivity and high insulating values. Commercial foams with high insulation value are blown from low temperature boiling liquids such as hydrocarbons and hydro fluorocarbons (HFCs), which exhibit a gas phase thermal conductivity in the range of 0.008-0.015 W/m·K. Therefore, the foams that result from such blowing agents can exhibit thermal conductivity in the range 0.018-0.030 W/m·K. However, some of the hydrocarbons and hydro fluorocarbons (HFCs) are being phased out due to their ozone depletion potential (ODP) and global warming potential (GWP).

Furthermore, closed-cell foams derived from polystyrene and polyurethane that can have a thermal conductivity of less than 0.03 W/m·K are highly flammable and thus have limited application as building insulation material even with the addition of flame retardants. Foams derived from polyisocyanurates exhibit better flame resistance than polystyrene and polyurethane, and phenolic foams exhibit even better flame resistance than polyisocyanurate foams. However, phenolic foams use a phenol based monomer which is produced from a petroleum feedstock, a depleting non-renewable resource.

Meikleham at al., *Journal of Applied Polymer Science*, 53, 1547-1556, doi: 10.1002/app.1994.070531117 disclose copolymer tannin foams, tannin-formaldehyde/urea-formaldehyde (TF-UF) and tannin-formaldehyde/diphenylmethane-4,4'-diisocyanate (TF-MDI) of varying compositions.

Hence, there is a need for low thermal conductivity and fire resistant polymeric foams formed from bio-derived materials having a closed-cell structure with trapped blowing agent preferably with low ODP and low GDP.

SUMMARY OF THE INVENTION

In an aspect of the invention, there is a foam comprising:
(a) a continuous polymeric phase defining a plurality of cells, wherein:
the continuous polymeric phase comprises a mixed-resin derived from a phenol, a tannin, and a first monomer, the first monomer comprising formaldehyde, paraformaldehyde, furfural, glyoxal, acetaldehyde, 5-hydroxymethylfurfural, 5-furandicarboxylic aldehyde, difurfural (DFF), or mixtures thereof, and
the plurality of cells comprises a plurality of open-cells and a plurality of closed-cells with an open-cell content measured according to ASTM D6226-5, of less than 50%; and
(b) a discontinuous phase disposed in at least a portion of the plurality of closed-cells, the discontinuous phase comprising one or more blowing agents.

In another aspect of the invention, there is a process comprising:
(a) forming a phenolic resole by mixing a phenol with a first monomer at a temperature in the range of room temperature to 90° C., wherein the first monomer comprises formaldehyde, paraformaldehyde, furfural, glyoxal, acetaldehyde, 5-hydroxymethylfurfural, 5-furandicarboxylic aldehyde, difurfural (DFF), or mixtures thereof; and
(b) adding a tannin to the phenolic resole to form a mixed-resin, wherein the phenol, the tannin, and the first monomer are present in a weight ratio 1:0.05:0.3 to 1:3:3.

In another aspect of the invention, there is a process comprising:
(a) mixing 30-90% by weight of a mixed-resin with 1-30% by weight of one or more blowing agents to form a pre-foam mixture, wherein the mixed-resin is derived from a phenol, a tannin, and a first monomer, the first monomer comprising formaldehyde, paraformaldehyde, furfural, glyoxal, acetaldehyde, 5-hydroxymethylfurfural, 5-furandicarboxylic aldehyde, difurfural (DFF), or mixtures thereof;
(b) mixing 5-30%, by weight of an acid catalyst with the pre-foam mixture to form a foam composition; and
wherein 0.5-10% by weight of a surfactant is added to at least one of the steps (a) or (b), and
wherein the amounts in %, by weight are based on the total weight of the pre-foam mixture,
(c) processing the foam composition to form a foam.

The foregoing general description and the following detailed description are exemplary and explanatory only and are not restrictive of the invention, as defined in the appended claims.

DETAILED DESCRIPTION

Disclosed is a foam comprising a continuous polymeric phase defining a plurality of cells, wherein the continuous polymeric phase comprises a tannin-based resin derived from a phenol, a tannin and a first monomer, and wherein the plurality of cells comprises a plurality of open-cells and a plurality of closed-cells. The foam also comprises a discontinuous phase disposed in at least a portion of the plurality of closed-cells, the discontinuous phase comprising one or more blowing agents.

As used herein, the term "open-cell" refers to individual cells that are ruptured or open or interconnected producing a porous "sponge" foam, where the gas phase can move around from cell to cell. As used herein, the term "closed-cell" refers to individual cells that are discrete, i.e. each closed-cell is enclosed by polymeric sidewalls that minimize the flow of a gas phase from cell to cell. It should be noted that the gas phase may be dissolved in the polymer phase besides being trapped inside the closed-cell. Furthermore, the gas composition of the closed-cell foam at the moment of manufacture does not necessarily correspond to the equilibrium gas composition after aging or sustained use. Thus, the gas in a closed-cell foam frequently exhibits compositional changes as the foam ages leading to such known phenomenon as increase in thermal conductivity or loss of insulation value.

In one embodiment, the foam has an open-cell content of less than 50% or less than 40%, or less than 30%, as measured according to ASTM D6226-5. In another embodiment, the foam has an open-cell content of less than 20% or less than 10%, as measured according to ASTM D6226-5.

The phenol used in the foam may be phenol or a substituted phenol. As used herein, the term "substituted phenol" refers to a molecule containing a phenolic reactive site and can contain another substituent group or moiety. Exemplary phenols include, but are not limited to, ethyl phenol, p-tertbutyl phenol; ortho, meta, and pare cresol; resorcinol; catechol; xylenol; and the like.

In an embodiment, the tannin used in the foam comprises a bio-derived tannin. As used herein, bio-derived tannins are vegetable-based, extracted from leaf, bud, seed, root, bark, trunk, nut shells, skins of fruits, and stem tissues of plants and trees. Exemplary bio-derived tannins include, but are not limited to, mimosa, acacia, quebracho, pine, spruce, fir, tanoak, oak, birch, maple, eucalyptus, tare, catechu, or mixtures thereof. As used herein, the term "mimosa tannin" refers to a tannin extracted from leaf, bud, seed, root, bark, trunk, or stem tissues of a mimosa tree; and so on. In an embodiment, the continuous polymeric phase of the foam comprises a tannin-based resin derived from a monomer and a tannin comprising at least one of a mimosa tannin, a quebracho tannin, or a spruce tannin. In another embodiment, the tannin used in the foam comprises a synthetic tannin. Synthetic tannins are also known as syntans. Exemplary syntans include, but are not limited to, sulfonated phenol-formaldehyde resins, sulfonated melamine-formaldehyde resin, sulfonated naphtalene-formaldehyde resins. In another embodiment, the tannin is a mixture of bio-derived tannin and syntan.

A suitable first monomer is selected from formaldehyde, paraformaldehyde, furfural, glyoxal, acetaldehyde, 5-hydroxymethylfurfural, 5-furandicarboxylic aldehyde, difurfural (DFF), or mixtures thereof.

In an embodiment, the mixed-resin is derived from a phenol, a tannin, a first monomer, and a second monomer. Suitable second monomer comprises acrolein, levulinate esters, sugars, 2,5-furandicarboxylic acid, urea, furfuryl alcohol, glycerol, sorbitol, lignin, or mixtures thereof. Other suitable biomass derived monomers (first or second) are disclosed in "*Liquid Phase catalytic Processing of Biomass-derived Oxygenated Hydrocarbons to fuels and Chemicals*", by Chheda et. al. in *Angewandte Chemie, Int.*, 2007, 46, 7164-7183, the disclosure of which is incorporated by reference herein in its entirety.

In an embodiment, the continuous polymeric phase of the foam comprises a mixed-resin derived from a phenol, a tannin, and a first monomer present (as reactants) in a weight ratio in the range of 1:0.05:0.3 to 1:3:3 or 1:0.1:0.5 to 1:2.5: 2.8. In another embodiment, the continuous polymeric phase of the foam comprises a mixed-resin derived from a phenol, a tannin, urea and a first monomer, wherein the phenol, urea, and the first monomer are present in a weight ratio of 1:0.05: 0.3 to 1:0.008:3 or 1:0.04:0.5 to 1:0.008:2.8. In another case, the tannin, urea, and the first monomer are present in a weight ratio of 1:0.05:1.3 to 1:0.016:3.2 or 1:0.03:0.6 to 1:0.008:2.8. In one embodiment, the first monomer is formaldehyde and the continuous polymeric phase of the foam comprises a mixed-resin derived from a phenol, a tannin, and formaldehyde. In another embodiment, the mixed-resin is derived from a phenol, a tannin, urea, and formaldehyde.

As used herein, the term "blowing agent" is used interchangeably with the term "foam expansion agent". In general, the blowing agent must be volatile and inert, and can be inorganic or organic. In an embodiment, at least one of the one or more blowing agents has a gas phase thermal conductivity of less than or equal to 0.016 W/m·K or less than or equal to 0.014 W/m·K or less than or equal to 0.012 W/m·K at 25° C. In an embodiment, at least one of the one or more blowing agents present in the foam comprises 1,1,1,4,4,4-hexafluoro-2-butene available as FEA-1100 from E. I. du Pont de Nemours and Company (Wilmington, Del.). In another embodiment, at least one of the one or more blowing agents present in the foam comprises carbon dioxide; hydrocarbons such as pentane, isopentane, cyclopentane petroleum ether, and ether; hydrochlorofluorocarbons such as 1,1-dichloro-1-fluoroethane (HCFC-141b); 2,2-dichloro-1,1,1-trifluoroethane (HCFC-123); 1-chloro-1,1-difluoroethane (HCFC-142b); 1,1,1,2-tetrafluoroethane (HCFC-134a); 1,1,1,3,3-pentafluoropropane (HFC-245fa) available from Honeywell (Morristown, N.J.); 1,1,1,3,3-pentafluorobutane (HFC-365) available as Solkane® 365 mfc from Solvay Chemicals (Bruxelles, Belgium); incompletely halogenated hydrocarbons such as 2-chloropropane; fluorocarbons such as dichlorodifluoromethane, 1,2-dichloro-1,1,2,2-tetrafluoroethane (CFC-114), trichlorotrifluoroethane (CFC-113), trichloromonofluoromethane (CFC-11), or mixtures thereof.

As used herein, ozone depletion potential (ODP) of a chemical compound is the relative amount of degradation to the ozone layer it can cause, with trichlorofluoromethane (CFC-11) being fixed at an ODP of 1.0. As used herein, the global-warming potential (GWP) used herein is a relative measure of how much heat a greenhouse gas traps in the atmosphere. It compares the amount of heat trapped by a certain mass of the gas in question to the amount heat trapped by a similar mass of carbon dioxide, which is fixed at 1 for all time horizons (20 years, 100 years, and 500 years), For example, CFC-11 has GWP (100 years) of 4750. Hence, from the global warming perspective, a blowing agent should have zero ODP and as low GWP as possible.

In some embodiments, at least one of the one or more blowing agents has an ozone depletion potential (ODP) of less than 2, or less than 1 or 0. In other embodiments, at least one of the one or more blowing agents has a global warming potential (GWP) of less than 5000, or less than 1000, or less than 500. An exemplary blowing agent with zero ODP and a low GWP is 1,1,1,4,4,4-hexafluoro-2-butene (ODP=0 and GWP=5).

In one embodiment, the foam has a density in the range of 10-500 kg/m$^3$, or 20-100 kg/m$^3$, or 20-80 kg/m$^3$.

In another embodiment, the foam has a thermal conductivity in the range of 0.015-0.05 W/m·K, or 0.015-0.04 W/m·K, or 0.015-0.03 W/m·K. The overall conductivity of the foam is strongly determined by the thermal conductivity of the gas phase or the discontinuous phase and the open-cell content of the foam. This is because the gas phase or the discontinuous phase disposed in at least a portion of the plurality of the closed-cells in a low-density foam (having a density in the range of 20-80 kg/m$^3$), usually makes up about 95% of the total foam volume. Hence, only those foams that are blown from low thermal conductivity blowing agents and result in closed cell structures, with significant fraction of the blowing agent trapped within the closed cells, can exhibit thermal conductivity lower than that of air. For example, if the open-cell content of a low density foam is more than 90%, then the foam will constitute mostly air, which exhibits a thermal conductivity in the range of 0.025-0.026 W/m·K at room temperature. Thus, a predominantly open-cell foam (with an open-cell content of more than 90%) will exhibit a thermal conductivity that is greater than 0.025 W/m·K. Similarly, a predominantly closed-cell foam (with closed-cell content of more than 90%) will have a thermal conductivity determined by the gas phase thermal conductivity of the blowing agent. For foams with an intermediate level (20-80%) of open cell and/or closed cell content, the thermal conductivity of the foam will be determined by the volume fraction and the thermal conductivity of the blowing agent.

For several different applications where thermal insulation is required, it is desirable that the insulation material exhibit low flammability, Flammability of a material may be evaluated by several different methods known to those skilled in the art. One method is to measure the Limiting Oxygen Index (LOI), which represents the concentration of oxygen required to sustain a flame during the burning of a material (ASTM 2863). The higher the LOI of a material the lower is its flammability. Thus, it is desirable that insulating foams exhibit as high a LOI as possible. In an embodiment, the disclosed foam has a limiting oxygen index (LOI) of at least 23, or at least 25, or at least 30.

In addition to the closed cell content, the size of the cells in a foam can also affect the resulting thermal conductivity. In addition to thermal properties, the cell size of the foam can also affect other properties of the foam, such as but not limited to the mechanical properties. In general, it is desirable that the cells of the foam be small and uniform. However, the size of the cells cannot be reduced indefinitely because for a given density foam if the cell size becomes too small the thickness of the cell walls can become exceedingly thin and hence can become weak and rupture during the blowing process or during use. Hence, there is an optimum size for the cells depending on the density of the foam and its use. In one embodiment, a cell, either an open-cell or a dosed-cell, has an average size of less than 500 microns. In another embodiment, the cell has an average size of less than 300 microns and in yet another embodiment the cell has an average size of less than 200 microns. Cell size may be measured by different methods known to those skilled in the art of evaluating porous materials. In one method, thin sections of the foam can be cut and subjected to optical or electron microscopic measurement, such as using a Hitachi S2100 Scanning Electron Microscope available from Hitachi instruments (Schaumburg, Ill.).

In an embodiment, the continuous polymer phase further comprises one or more surfactants, with at least one of ionic or non-ionic surfactants, including polymeric surfactants. A class of suitable surfactants includes siloxane-oxyalkylene copolymers such as those containing Si—O—C as well as Si—C linkages. The siloxane-oxyalkylene copolymers can be block copolymers or random copolymers. Typical siloxane-oxyalkylene copolymers contain a siloxane moiety composed of recurring dimethylsiloxy units endblocked with mononethylsiloxy and/or trimethylsiloxy units and at least one polyoxyalkylene chain composed of oxyethylene and/or oxypropylene units capped with an organic group such as an ethyl group. Suitable siloxane-oxyalkylene copolymeric surfactants include, but are not limited to, polyether-modified polysiloxanes, available as Tegostab B8406 from Evonik Goldschmidt Corporation (Hopewell, Va.); (polyalkyleneoxide modified heptamethyltrisiloxane available as Silwet L-77 from OSi Specialties (Danbury Conn.).

Another class of suitable surfactants includes silicone surfactants such as, L-7003, L-5350, L-5420, and L-5340 silicone surfactants, all available from Union Carbide Corporation, DC 193 available from Dow Chemical Co. (Midland, Mich.), and SF™ 1188 silicone surfactant available from GE Bayer Silicones.

Another class of suitable surfactants includes non-ionic organic surfactants such as the condensation products of alkylene oxides such as ethylene oxide, propylene oxide or mixtures thereof, and alkylphenols such as nonylphenol, dodecylphenol, and the like. Suitable non-ionic organic surfactants include, but are not limited to, polysorbate (Tween®) surfactant, for example Tween® 20, Tween® 21, Tween® 61, Tween® 80 or Tween® 81 all available from Aldrich Chemical Company; Pluronic® non-ionic surfactants available from BASF Corp., (Florham Park, N.J.); Tergitol™; Brij® 98, Brij® 30, and Triton X 100, all available from Aldrich Chemical Company; and Merpol® LF available from E. I. du Pont de Nemours and Company (Wilmington Del.). Suitable ionic surfactant includes, but is not limited to sodium dodecylsulfonate (SDS).

In other embodiment, the continuous polymer phase further comprises one or more acid catalysts. Suitable acid catalysts include, but are not limited to, benzenesulfonic acid, para-toluenesulfonic acid, xylenesulfonic acid, naphthalenesulfonic acid, ethylbenzenesulfonic acid, phenolsulfonic acid, sulfuric acid, phosphoric acid, boric acid, hydrochloric acid or mixtures thereof.

In another embodiment, the continuous polymer phase further comprises one or more additives. Suitable additives include, but are not limited to, cellulose fiber, bacterial cellulose, sisal fiber, clays. Kaolin-type clay, mica, vermiculite, sepiolite, hydrotalcite and other inorganic platelet materials, glass fibers, polymeric fibers, alumina fibers, aluminosilicate fibers, carbon fibers, carbon nanofibers, poly-1,3-glucan, lyocel fibers, chitosan, boehmite (AlO.OH), zirconium oxide, or mixtures thereof. The additive can also be a plasticizer comprising a polyester polyol, formed by the reaction of a polybasic carboxylic acid with a polyhydridic alcohol selected from a dihydridic to a pentahydridic. Examples of the acid include but are not limited to adipic acid, sebacic acid, naphthalene-2,6-dicarboxylic acid, cyclohexane-1,3-dicarboxylic acid, phthalic acid. Examples of the polyhydric alcohol include but are not limited to ethylene glycol, propylene diol, propylene glycol, 1,6-hexane diol, 1,4-butane diol and 1,5-pentane diol. In an embodiment, the plasticizer is polyester polyol. The average molecular weight is in the range of 100-50,000 g/mol, or 200-40,000 g/mol, or 200-1000 g/mol.

In one embodiment, the tannin-phenolic foam is disposed between two similar or dissimilar non-foam materials, also called facers to form a sandwich panel structure. Any suitable material can be used for the facers. In one embodiment, the facers may be formed from a metal such as, but not limited to aluminum and stainless steel. In another embodiment, the facers may be formed from plywood, cardboard, composite board, oriented strand board, gypsum board, fiber glass board, and other building materials known to those skilled in the art. In another embodiment, the facers may be formed from nonwoven materials derived from glass fibers and/or polymeric fibers such as Tyvek® and Typar® available from E. I. DuPont de Nemours & Company. In another embodiment, the facers may be formed from woven materials such as canvas and other fabrics. Yet, in another embodiment, the facers may be formed of polymeric films or sheets. Exemplary polymers for the facer may include, but are not limited to, polyethylene, polypropylene, polyesters, and polyamides.

The disclosed mixed tannin-phenolic foams have less formaldehyde than conventional phenol-formaldehyde foams, have bio-derived content and better flame resistance than conventional phenol-formaldehyde foams. The disclosed tannin foams could be used for a variety of applications, including, but not limited to, thermal insulation of building envelopes, and household and industrial appliances. Furthermore, the disclosed foams can also be used in combination with other materials such as silica aerogels as a support for the fragile aerogel, and potentially as a catalyst support.

Additional advantages of the disclosed foams include, but are not limited to mold resistance, enhanced biodegradability, and micro-organism resistance.

In accordance with the present invention, there is provided a process of making a tannin-phenolic foam. The process comprises a phenolic resole by mixing a phenol with a first monomer at a temperature in the range of room temperature to 90° C. and adding a tannin as a co-reactant to the phenolic resole to form a mixed-resin, such that the phenol, the tannin, and the monomer are present in a weight ratio 1:0.05:0.3 to 1:3:3 or 1:0.1:0.5 to 1:2.5:2.8.

The phenol used in the phenol-formaldehyde resole may be phenol or a substituted phenol. As used herein, the term "substituted phenol" refers to a molecule containing a phenolic reactive site and can contain another substituent group or moiety. Exemplary phenols include, but are not limited to, ethyl phenol, p-tertbutyl phenol; ortho, meta, and para cresol; resorcinol; catechol; xylenol; and the like.

The tannin used in the tannin-phenolic foam may comprise a bio derived tannin, a syntan, or a mixture thereof. Suitable bio-derived tannin comprises mimosa, acacia, quebracho, pine, spruce, fir, tanoak, oak, birch, maple, eucalyptus, tare, catechu, or mixtures thereof. In an embodiment, the tannin is dried. The tannin may be dried at a temperature in the range of 50-200° C., or 80-150° C., or 90-120° C. for an amount of time in the range of 1-7 days, or 1-5 days, or 1-3 days before the step of mixing the tannin with a monomer, and water. In another embodiment, the tannin is used as is.

Suitable first monomer comprises formaldehyde, paraformaldehyde, furfural, glyoxal, acetaldehyde, 5-hydroxymethylfurfural, 5-furandicarboxylic aldehyde, difurfural (OFF), or mixtures thereof.

In an embodiment, the step of adding a tannin to the phenolic resole comprises adding a mixture of a tannin and at least one of a first monomer or a second monomer to the phenolic resole. Suitable second monomer comprises acrolein, levulinate esters, sugars, 2,5-furandicarboxylic acid, urea, furfuryl alcohol, glycerol, sorbitol, lignin, or mixtures thereof. Other suitable biomass derived monomers (first or second) are disclosed in "*Liquid Phase catalytic Processing of Biomass-derived Oxygenated Hydrocarbons to fuels and Chemicals*", by Chheda et. al. in *Angewandte Chemie, Int.*, 2007, 46, 7164-7183, the disclosure of which is incorporated by reference herein in its entirety.

In one embodiment, the process comprises adding urea to the reaction mixture, such that the phenol, urea, and the monomer are present in a weight ratio of 1:0.05:0.3 to 1:0.008:3 or 1:0.04:0.5 to 1:0.008:2.8

The process of making a phenolic resole further comprises adjusting the pH of a reaction mixture comprising a phenol and a first monomer in the range of 7-10 or 8-9 and heating the reaction mixture at 1-10° C./min to a temperature in the range of 70-95° C. The process also comprises keeping the temperature of the reaction mixture constant in the range of 70-95° C. and cooling the reaction mixture to room temperature and adjusting the pH to be in the range of 6-8. The process also comprises removing volatiles from the mixed resin.

The step of adding a tannin to the phenolic resole may comprise providing a residence time to effectively dissolve the tannin in a reaction mixture comprising a phenol and a first monomer or the phenolic resole. At the start of the residence time, the mixture of tannin and the reaction mixture may comprise agglomerates of tannin, wherein one may observe a two phase system with one phase being agglomerates of tannin and the other phase being liquid comprising dissolved tannin in the phenol, the first monomer, and water. As the agglomerates of tannin dissolves, the mixture becomes more viscous. At the end of the residence time, the mixture is a one phase system comprising dissolved tannin in the reaction mixture comprising a phenol and a first monomer. The step of providing a residence time may involve keeping the mixture of tannin and at least one of the phenolic resin or the reaction mixture still for the residence time, or mixing the mixture for a certain amount of time, or mixing and keeping still for the rest of the residence time.

Any suitable method can be used to mix a tannin with the reaction mixture comprising a phenol and a monomer, such as, for example, hand mixing, mechanical mixing using a Kitchen-Aid® mixer, a twin screw extruder, a bra-blender, an overhead stirrer, a ball mill, an attrition mill, a Waring blender, or a combination thereof.

The process of making a tannin-phenolic foam further comprises mixing 30-90% or 40-90% by weight of a mixed-resin with one or more blowing agents present in the range of 1-30%, or 1-20%, or 1-10% by weight, wherein the amounts in % by weight are based on the total weight of the pre-foam mixture.

In one embodiment, the mixed-resin is derived from a phenol, a tannin, a first monomer, and a second monomer. In another embodiment, the step of mixing a mixed-resin with one or more blowing agents comprises mixing a mixed-resin with one or more blowing agents and at least one of a first monomer or a second monomer In an embodiment, at least one of the one or more blowing agents has a gas phase thermal conductivity of less than or equal to 0.016 W/m·K or less than or equal to 0.014 W/m·K or less than or equal to 0.012 W/m·K at 25° C. In other embodiment, at least one of the one or more blowing agents is 1,1,1,4,4,4-hexafluoro-2-butene available as FEA-1100 from E. L du Pont de Nemours and Company (Wilmington, Del.). Suitable blowing agents include, but are not limited to carbon dioxide; hydrocarbons such as pentane, isopentane, cyclopentane petroleum ether, and ether; hydrochlorofluorocarbons such as 1,1-dichloro-1-fluoroethane (HCFC-141b); 2,2-dichloro-1,1,1-trifluoroethane (HCFC-123); 1-chloro-1,1-difluoroethane (HCFC-142b); 1,1,1,2-tetrafluoroethane (HCFC-134a); 1,1,1,3,3-pentafluoropropane (HFC-245fa) available from Honeywell (Morristown, N.J.); 1,1,1,3,3-pentafluorobutane (HFC-365) available as Solkane® 365 mfc from Solvay Chemicals (Bruxelles, Belgium); incompletely halogenated hydrocarbons such as 2-chloropropane; fluorocarbons such as dichlorodifluoromethane, 1,2-dichloro-1,1, 2,2-tetrafluoroethane (CFC-114), trichlorotrifluoroethane (CFC-113), trichloromonofluoromethane (CFC-11), or mixtures thereof. The amount of blowing agent is in the range of 1-30%, or 1-20%, or 1-10%, by weight, based on the total weight of the pre-foam mixture.

The process of making a tannin-phenolic foam further comprises mixing 5-30%, or 10-25%, or 10-20%, by weight of an acid catalyst with the pre-foam mixture to form a foam composition, based on the total weight of the pre-foam mixture. Suitable acid catalyst comprises benzenesulfonic acid, para-toluenesulfonic acid, xylenesulfonic acid, naphthalenesulfonic acid, ethylbenzenesulfonic acid, phenolsulfonic acid, sulfuric acid, phosphoric acid, boric acid, hydrochloric acid or mixtures thereof. In another embodiment, the acid catalyst comprises para-toluenesulphonic acid and xylenesulphonic acid in a weight ratio in the range of 0.67:1 to 9:1, or 2:1 to 7:1, or 3:1 to 5:1. In other embodiment, the acid catalyst is dissolved in a minimum amount of solvent, the solvent comprising ethylene glycol, propylene glycol, dipropylene glycol, butyrolactone, dimethyl sulfoxide, N-methyl-2-pyrrolidone, morpholines, propane diol, or mixtures thereof. A catalyst is normally required to produce the foam but in some cases, a foam can be made without a catalyst but rather using thermal aging. A combination of thermal aging and a catalyst is commonly used. In some cases, the reaction is exothermic and hence little or no additional heat may be required.

In one embodiment, the process of making a tannin-phenolic foam comprises adding a surfactant to the pre-foam mixture. The surfactant may be first mixed with the blowing agent and then the mixture of blowing agent and the surfactant is mixed with the mixed resin to form a pre-foam mixture. In another embodiment, a surfactant is mixed with the acid catalyst. The amount of surfactant present in at least one of the mixed resin, the pre-foam mixture, or the foam composition is in the range of 0.5-10%, or 2-8%, or 3-6%, by weight, based on the total weight of the pre-foam mixture.

The surfactant is present in an effective amount to emulsify the agglomerate-free solution, the blowing agent, the catalyst and optional additives of the foam composition. The surfactant is added to lower the surface tension and stabilize the foam cells during foaming and curing. The surfactant is at least one of ionic or non-ionic surfactants, including polymeric surfactants. A class of suitable surfactants includes siloxane-oxyalkylene copolymers such as those containing Si—O—C as well as Si—C linkages. The siloxane-oxyalkylene copolymers can be block copolymers or random copolymers. Typical siloxane-oxyalkylene copolymers contain a siloxane moiety composed of recurring dimethylsiloxy units endblocked with mononethylsiloxy and/or trimethylsiloxy units and at least one polyoxyalkylene chain composed of oxyethylene and/or oxypropylene units capped with an organic group such as an ethyl group. Suitable siloxane-oxyalkylene copolymeric surfactants include, but are not limited to, polyether-modified polysiloxanes, available as Tegostab B8406 from Evonik Goldschmidt Corporation (Hopewell, Va.); (polyalkyleneoxide modified heptamethyltrisiloxane available as Silwet L-77 from OSi Specialties (Danbury Conn.).

Another class of suitable surfactants includes silicone surfactants such as, L-7003, L-5350, L-5420, and L-5340 silicone surfactants, all available from Union Carbide Corporation, DC 193 available from Dow Chemical Co. (Midland, Mich.), and SF™ 1188 silicone surfactant available from GE Bayer Silicones.

Another class of suitable surfactants includes non-ionic organic surfactants such as the condensation products of alkylene oxides such as ethylene oxide, propylene oxide or mixtures thereof, and alkylphenols such as nonylphenol, dodecylphenol and the like. Suitable non-ionic organic surfactants include, but are not limited to, polysorbate (Tween®) surfactant, for example Tween® 20, Tween® 21, Tween® 61, Tween® 80 or Tween® 81 all available from Aldrich Chemical Company; Pluronic® non-ionic surfactants available from BASF Corp., (Florham Park, N.J.); Tergitol™; Brij® 98, Brij® 30, and Triton X 100, all available from Aldrich Chemical Company; and Merpol®LF available from E. I. du Pont de Nemours and Company (Wilmington Del.). Suitable ionic surfactant includes, but is not limited to sodium dodecylsulfonate (SDS).

The process of making a tannin-phenolic foam also comprises processing the foam composition to form a foam comprising a continuous polymeric phase defining a plurality of cells, and a discontinuous phase comprising the one or more blowing agents disposed in at least a portion of the plurality of cells. The step of processing the foam composition comprises maintaining the foam composition at an optimum temperature. In an embodiment, the optimum temperature is in the range of 25-100° C., or 35-90° C., or 45-85° C. In another embodiment, the step of processing the foam composition comprises foaming the foam composition in a substantially closed mold. In one embodiment, the foam composition is first foamed at an optimum temperature in the range of 25-100° C., or 35-90° C., or 45-85° C. in an open mold and then the mold is closed and kept at that temperature for an amount of time in the range of 25-100° C., or 35-90° C., or 45-85° C. As used herein, the term "closed mold" means partially closed mold where some gas may escape, or completely closed mold, where the system is sealed. In some cases, the foam is formed in a closed mold or under application of pressure to control the foam density. Pressures from atmospheric to up to 5000 kPa may be applied depending upon the desired foam density.

In an embodiment, the process of making a tannin-phenolic foam further comprises adding an additive to at least one of the phenolic resole, the tannin, the mixed-resin or the pre-foam mixture. The amount of additive is in the range of 5-50%, or 10-45%, or 15-40%, by weight based on the total weight of the pre-foam mixture. Suitable additives include, but are not limited to, cellulose fiber, bacterial cellulose, sisal fiber, clays, Kaolin-type clay, mica, vermiculite, sepiolite, hydrotalcite and other inorganic platelet materials, glass fibers, polymeric fibers, alumina fibers, aluminosilicate fibers, carbon fibers, carbon nanofibers, poly-1,3-glucan, lyocel fibers, chitosan, boehmite (AlO.OH), zirconium oxide, or mixtures thereof. The additive can also be a plasticizer comprising a polyester polyol, formed by the reaction of a polybasic carboxylic acid with a polyhydridic alcohol selected from a dihydridic to a pentahydridic. Examples of the acid include but are not limited to adipic acid, sebacic acid, naphthalene-2,6-dicarboxylic acid, cyclohexane-1,3-dicarboxylic acid, phthalic acid. Examples of the polyhydric alcohol include but are not limited to ethylene glycol, propylene diol, propylene glycol, 1,6-hexane diol, 1,4-butane diol and 1,5-pentane diol. In an embodiment, the plasticizer is polyester polyol. The average molecular weight is in the range of 100-50,000 g/mol, or 200-40,000 g/mol, or 200-1000 g/mol.

In one embodiment, the process of making a tannin-phenolic foam further comprises disposing a tannin-phenolic foam between two similar or dissimilar non-foam materials, also called facers to form a sandwich panel structure. Any suitable material can be used for the facers. In one embodiment, the facers may be formed from a metal such as, but not limited to aluminum and stainless steel. In another embodiment, the facers may be formed from plywood, cardboard, composite board, oriented strand board, gypsum board, fiber glass board, and other building materials known to those skilled in the art. In another embodiment, the facers may be formed from nonwoven materials derived from glass fibers and/or polymeric fibers such as Tyvek® and Typar® available from E. I. DuPont de Nemours & Company. In another embodiment, the facers may be formed from woven materials such as canvas and other fabrics. Yet, in another embodiment, the facers may be formed of polymeric films or sheets. Exemplary polymers for the facer include, but are not limited to, polyethylene, polypropylene, polyesters, and polyamides.

The thickness of the facer material would vary depending on the application of the sandwich panel. In some cases, the thickness of the facer material could be significantly smaller than the thickness of the foam while in other cases the thickness of the facer material could be comparable or even greater than the thickness of the sandwiched foam.

In some embodiments, the facer material may be physically or chemically bonded to the tannin-phenolic foam to increase the structural integrity of the sandwich panel. Any suitable method can be used for physical means of bonding including, but not limited to, surface roughening by mechanical means and etching by chemical means. Any suitable method can be used for chemical bonding including, but not limited to, use of coatings, primers, and adhesion promoters that form a tie layer between the facer surface and the foam.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the phrase "one or more" is intended to cover a non-exclusive inclusion. For example, one or more of A, B, and C implies any one of the following: A alone, B alone, C alone, a combination of A and B, a combination of B and C, a combination of A and C, or a combination of A, B, and C.

Also, use of "a" or "an" are employed to describe elements and described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

In the foregoing specification, the concepts have been disclosed with reference to specific embodiments. However, one of ordinary skill in the art appreciates that various modifications and changes can be made without departing from the scope of the invention as set forth in the claims below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all embodiments.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value found within that range.

The concepts disclosed herein will be further described in the following examples, which do not limit the scope of the invention described in the claims.

The examples cited here relate to mixed tannin-phenolic foams derived from a tannin, a phenol, and formaldehyde. The discussion below describes how a tannin-phenolic foam is formed.

EXAMPLES

Test Methods

Density Measurement

Apparent density ($\rho$) of the foams was measured by a) cutting a foam into a regular shape such as a rectangular cube or cylinder, b) measuring the dimensions and the weight of the foam piece, c) evaluating the volume of the foam piece and then dividing the weight of the foam piece by the volume of the foam piece.

More specifically, three cylindrical pieces were cut from a test foam using a brass corer having an internal diameter of 1.651 mm (0.065") to calculate the average apparent density of the test foam. The diameter and the length of the cylindrical pieces were measured using Vernier calipers and then the volume (V) of the cylinder was calculated. The mass (m) of each cylindrical piece was measured and used to calculate the apparent density ($\rho_a$) of each foam piece.

$$\rho_a = \frac{m}{V}$$

Open-Cell Content

Open-cell content of foams was determined using ASTM standard D6226-5. All measurements were made at room temperature of 24° C.

Pycnometer density ($\rho$) of each cylindrical piece was measured using a gas pycnometer, Model # Accupyc 1330 (Micromeritics Instrument Corporation, Georgia, U.S.A) at room temperature using nitrogen gas.

The AccuPyc works by measuring the amount of displaced gas. A cylindrical foam piece was placed in the pycnometer chamber and by measuring the pressures upon filling the chamber with a test gas and discharging it into a second empty chamber, volume ($V_s$) of the cylindrical foam piece that was not accessible to the test gas was calculated. This measurement was repeated five times for each foam cylindrical piece and the average value for $V_s$ was calculated.

The volume fraction of open-cells ($O_v$) in a foam sample was calculated by the following formula:

$$O_v = \frac{(V - V_s)}{V}$$

Assuming the specific gravity of the solid polymer to be 1 g/cm$^3$, the volume fraction of the cell walls ($CW_v$) was calculated from the following formula:

$$CW_v = \frac{m}{V}$$

Thus, the volume fraction of closed-cells ($C_v$) was estimated by the following equation:

$$C_v = 1 - O_v - CW_v$$

Thermal Conductivity

Hot Disk Model # PPS 2500S (Hot Disk AB, Gothenberg, Sweden) was used to measure thermal conductivities of the foams.

A foam whose thermal conductivity needed to be measured was cut into two rectangular or circular test pieces of same size. The lateral dimensions and the thickness of the foam pieces were required to be greater than four times the radius of the Hot Disk heater and sensor coil. The radius of the heater and sensor coil for all measurements was 6.4 mm and hence the lateral dimensions and the thickness of the foam pieces were greater than 26 mm.

Before the start of a measurement protocol, the heater and sensor coil was sandwiched between two test pieces of foam and the entire assembly was clamped together to ensure intimate contact between the surfaces of the foam pieces and the heater and sensor coil.

At the start of a test, a known current and voltage was applied to the heater and sensor coil. As the heater and sensor coil heated up due to the passage of current through the coil, the energy was dissipated to the surrounding test pieces of foam. At regular time intervals during the experiment, the resistance of the heater and sensor coil was also measured using a precise wheat stone bridge built into the Hot Disk apparatus. The resistance was used to estimate the instantaneous temperature of the coil. The temperature history of the heater and sensor coil was then used to calculate the thermal conductivity of the foam using mathematical analysis presented in detail by Yi He in Thermochimica Acta 436, pp 122-129, 2005.

The test pieces of foam were allowed to cool and the thermal conductivity measurement on the test pieces was repeated two more times. The thermal conductivity data was then used to calculate the average thermal conductivity of the foam.

Limiting Oxygen Index (LOI)

The flammability of the foams was tested by the limiting oxygen index (LOI) method, according to ASTM D2863. LOI is the minimum concentration of oxygen, expressed as a volume percent, in a mixture of oxygen and nitrogen that will just support the flaming combustion of a material initially at room temperature under the conditions of ASTM D2863.

Starting Materials

As used in the Examples below, mimosa tannin was purchased from SilvaTeam (Italy). Phenol, furfuryl alcohol, urea, sodium hydroxide pellets, and 37% formaldehyde solution were purchased from Sigma-Aldrich (St. Louis, Mo.). Hydrochloric acid was obtained from Fisher Scientific. Surfactants, Tegostab B8406 (polyether-modified polysiloxane) was purchased from Evonik Goldschmidt Corporation (Hopewell, Va.), DC-193 was purchased from Dow Chemical Corp. (Midland, Mich.), and Tween 80 was purchased from Sigma-Aldrich (St. Louis, Mo.). Acid catalysts p-toluenesulfonic acid and xylenesulfonic acid were purchased from Sigma-Aldrich (St. Louis, Mo.). Blowing agents pentane was purchased from Sigma-Aldrich (St. Louis, Mo.) and FEA-1100 (1,1,1,4,4,4-hexafluoro-2-butene) was purchased from E. I. du Pont de Nemours and Company (Wilmington, Del.). Sisal fibers having a fiber diameter in the range of 100-200 microns were obtained from Wrigglesworth Imports (London UK), originally from Mombasa in Kenya. Sodium hydroxide (50 wt %) and hydrochloric acid (10 wt %) were prepared in the lab prior to use.

Example 1

Preparation of Tannin-Resole Based Foam with FEA-1100 (TPFF-1)

Step 1A: Preparation of Phenol-Formaldehyde Resole (PFR-1)

A phenol-formaldehyde resole was prepared by reaction of phenol (507.00 g, Aldrich Chemical Company, St. Louis, Mo.) with 961.92 g of a 37% formaldehyde solution (Aldrich) in a 2 L three-neck flask fitted with a reflux condenser and stirred using an overhead stirrer. The pH was adjusted to 8-9 using 7.531 g of 50 wt % sodium hydroxide (0.74 wt % based on the total amount of phenol) at room temperature. The flask and contents were suspended in an oil bath and the reaction mixture was slowly heated (approximately 1.48° C./min) to an internal temperature of 90° C. The phenol-formaldehyde mixture was then maintained at 90° C. for an additional 126 min. The reaction solution was then cooled in an ice bath to room temperature. A portion (1071.13 g) of the solution in the reaction flask was adjusted to pH 7.0 using hydrochloric acid (10 wt %). This solution was then concentrated via rotary evaporation in an 80° C. bath to 58.30% of the original weight (10 min at 150 mbar, 10 min at 100 mbar, and 5 min at 75 mbar). The resulting resole was a viscous solution with a measured viscosity of 5.4 Pas at 40° C.

Step 1B: Preparation of Tannin-Phenol-Formaldehyde Foam (TPFF-1) Using FEA-1100

Mimosa tannin was dried at 100° C. for 2 days before use. Furfuryl alcohol (7.2 g), 37% formaldehyde solution (2.0 g), water (4 g), and Tegostab 8406 (1 g) was mixed and added to the mimosa tannin (20 g). The mixture was stirred with a spatula. The sample was stirred about three times and the mixture left at room temperature for overnight. A portion (10 g) of the above mixture was removed and mixed with the resole PFR-1 (10 g), followed by the addition FEA-1100 (4.5 g) that was mixed into the mixture until a stable weight was achieved. Next, p-toluenesulfonic acid/xylenesulfonic acid (2.5 g, a 70/30 mixture dissolved in a minimum amount of ethylene glycol) was added and mixed for 1 min. The material was transferred to a 250 mL polypropylene bottle and placed in an oven at 50° C. with the cap off. After 5 min, the cap was placed on and the bottle along with its contents was left at 50° C. After three days, the cap was removed and the uncapped bottle was left at 50° C. for an additional 1 day to remove any volatiles.

Example 2-1

Preparation of Tannin-Phenol-Formaldehyde Foam Using FEA-1100 (TPFF-2-1)

Step 2A: Preparation of Phenol-Formaldehyde Resole (PFR-2)

A phenol-tannin-formaldehyde resole was prepared by a reaction of phenol (169 g) with a 37% formaldehyde solution (356 g) in a 1 L three-neck flask fitted with a reflux condenser and stirred using an overhead stirrer. After the mixture had dissolved, mimosa tannin (19 g) was added. The pH was adjusted to 8.78 using a sodium hydroxide solution (50 wt %), at room temperature. The flask and contents were suspended in an oil bath and the temperature in the oil was raised at 1° C.

per minute until the temperature reached 90° C. The phenol-formaldehyde mixture was stirred for an additional 3 h. The flask and contents were then allowed to cool to room temperature. The pH of the solution was adjusted to pH 6.87 using an aqueous hydrochloric acid solution (20 wt %). A small amount of water (~50 mL), which had phase separated, was decanted off. A portion (276 g) of the product was then placed on a rotary evaporator and heated under house vacuum at 80° C. to remove 82 g of volatiles, which left 194 g of a viscous tannin-phenol resole. The $^{13}$C NMR of the resole PFR-2 revealed small peaks around 34.5-36.5 and 41-41.5 characteristic of bridging methylene peaks.

Step 2B: Preparation of Tannin-Phenol-Formaldehyde Foam (TPFF-2-1) Using FEA-1100

A tannin-phenolic foam was made with the resole PFR-2 using the following method. The PFR-2 resole (10 g) was mixed using a spatula with surfactant DC-193 (0.4 g), followed by the addition of FEA-1100 (1.5 g) that was mixed into the mixture until a stable weight was achieved. Next, p-toluenesulfonic acid/xylenesulfonic acid (1.5 g, a 70/30 mixture dissolved in a minimum amount of ethylene glycol) was added and mixed for 1 min. A portion of the mixture was placed into a 200 mL polypropylene bottle. The bottle along with its contents was placed in an oven at 80° C. for 5 min, whereupon the foam began to rise. After 5 min, the bottle was sealed with the polypropylene cap and the bottle was returned to the oven and allowed to react for 40 min. The foam was removed from the bottle and the foam was placed back in the oven at 60° C. for overnight. The density of the as-prepared foam, TPFF-2-1 was 0.042 g/cc. The open-cell content of the foam was 28%.

Example 2-2

Preparation of Tannin-Phenol-Formaldehyde Foam (TPFF-2-2) Using FEA-1100

A tannin-phenolic foam was made with the resole PFR-2 using the following method. The PFR-2 resole (10 g) was mixed using a spatula with surfactant (0.4 g, Tween 80), followed by the addition of a foam expansion agent (1.5 g, FEA 1100, DuPont) that was mixed into the mixture until a stable weight was achieved. Next, p-toluenesulfonic acid/ xylenesulfonic acid (1.5 g, a 70/30 mixture dissolved in a minimum amount of ethylene glycol) was added and mixed for 1 min. A portion of the mixture was placed into a 200 mL polypropylene bottle. The bottle and contents were placed in an oven at 80° C. for exactly 5 min, whereupon the foam began to rise. After 5 min, the bottle was sealed with the polypropylene cap. The foam was returned to the oven and allowed to react for 40 min. The foam was removed from the bottle and the foam was placed back in the oven overnight at 60° C. The density of the as-prepared foam, TPFF-2-2 was 0.047 g/cc. The open-cell content of the foam was 43%.

Example 3

Preparation of Tannin-Phenol-Formaldehyde Foam (TPFF-3) Using FEA-1100

Step 3A: Preparation of Phenol-Formaldehyde Resole (PFR-3)

A phenol-formaldehyde resole was prepared by reaction of phenol (188 g) with a 37% formaldehyde solution (367 g) in a 1 L three-neck flask fitted with a reflux condenser and stirred using an overhead stirrer. The pH was adjusted to 8-9 using sodium hydroxide (50 wt %), at room temperature. The flask and contents were suspended in an oil bath and the temperature in the oil was raised at 1° C./min until the temperature reached 90° C. The phenol-formaldehyde mixture was stirred for an additional 90 min. The mixture was allowed to react for 1 h after which time urea (5.64 g) was added. The reaction was allowed to proceed for an additional 30 min. The flask and contents were then allowed to cool to room temperature. The pH of the solution was adjusted to pH 7 using hydrochloric acid (10 wt %). The product was then placed on a rotary evaporator and heated under house vacuum at 80° C. for about 3 h, removing approximately 280 g of volatiles. The resulting resole was a viscous solution with a measured viscosity of about 300 Pa·s. The $^{13}$C NMR of the resulting resole, PFR-3 revealed small peaks around 34.5-36.5 and 41-41.5 ppm, characteristic of bridging methylene peaks.

Step 3B: Preparation of Tannin-Phenol-Formaldehyde Foam (TPFF-3) Using FEA-1100

A tannin-phenolic foam was made using a mixture of resoles. A portion (5 g) of the phenolic resole PFR-3 was mixed with a portion (5 g) of PFR-2. The combined resoles was mixed using a spatula and surfactant (0.4 g, Evonik Tegostab 8406), followed by the addition of a foam expansion agent (1.5 g, FEA 1100, DuPont) that was mixed into the mixture until a stable weight was achieved. Next, p-toluenesulfonic acid/xylenesulfonic acid (1.5 g, a 70/30 mixture dissolved in a minimum amount of ethylene glycol) was added and mixed for 1 min. The mixture was left to rise in an oven at 80° C. in an open container for exactly 45 min, whereupon the foam began to rise. The foam was then left to post cure in the oven at 60° C. for overnight. The open-cell content of the as-prepared foam, TPFF-3 was 21.53%, and the measured thermal conductivity was 0.0256 W/m·K.

Example 4-1

Preparation of Tannin-Phenol-Formaldehyde Foam (TPFF-4-1) Using FEA-1100

Step 4A: Preparation of Phenol-Formaldehyde Resole (PFR-4)

A phenol-formaldehyde resole was prepared by reaction of phenol (507 g) with a 37% formaldehyde solution (961.94 g) in a 2 L three-neck flask fitted with a reflux condenser and stirred with an overhead stirrer. The pH was adjusted to 8-9 using a sodium hydroxide solution (50 wt %), at room temperature. The flask and contents were suspended in an oil bath and the temperature in the oil was raised at approximately 1.1° C./min until the internal temperature reached 90° C. The phenol-formaldehyde mixture was stirred for an additional 3 h at 90° C. The flask and contents were then allowed to cool to room temperature. The pH of the solution was adjusted to pH 6.9 using an aqueous hydrochloric acid solution (20 wt %). A portion of the product was then concentrated via rotary evaporation in an 80° C. bath to 57.20% of the original weight. The resulting resole was a viscous solution with a measured viscosity of 28 Pas at 40° C. The $^{13}$C NMR of the resulting resole PFR-4 revealed small peaks around 34.5-36.5 and 41-41.5 ppm characteristic of bridging methylene peaks.

Step 4B: Preparation of Tannin-Phenol-Formaldehyde Foam (TPFF-4-1) Using FEA-1100

A tannin-phenolic foam was made with the resole PFR-4 using the following method. The PFR-4 resole (10 g) was mixed using a spatula with surfactant (0.4 g, Evonik Tegostab 8406), followed by the addition of mimosa tannin (1.15 g, SilvaTeam, 16.14% based on the total amount of phenol) into the mixture. Next, a foam expansion agent (1.5 g, FEA 1100, DuPont) was mixed into the mixture until a stable weight was achieved. Next, p-toluenesulfonic acid/xylenesulfonic acid (1.5 g, a 70/30 mixture dissolved in a minimum amount of ethylene glycol) was added and mixed for 1 min. A portion of the mixture was placed into a 250 mL polypropylene bottle. The bottle and contents were placed in an oven at 80° C. for exactly 5 min, whereupon the foam began to rise. After 5 min, the bottle was sealed with the polypropylene cap. The foam was returned to the oven and allowed to react for 45 min. The cap was removed from the bottle and the foam was placed back in the oven overnight at 60° C. The density of the as-prepared foam, TPFF-4-1 was 0.043 g/cc. The open-cell content of the foam, TPFF-4-1 was 9.42%, and the measured thermal conductivity was 0.029 W/m·K.

Example 4-2

Preparation of Tannin-Phenol-Formaldehyde Foam (TPFF-4-2) Using FEA-1100

A tannin-phenolic foam was prepared using the PFR-4 resole and foaming procedure explained in the step 4B of Example 4-1, except that additional mimosa tannin (3.33 g, SilvaTeam, 35.79 wt % based on the total amount of phenol) was also blended into the mixture. The density of the as-prepared foam, TPFF-4-2 was 0.037 g/cc. The open-cell content of the foam, TPFF-4-2 was 52.30%, and the measured thermal conductivity was 0.035 W/m·K.

Example 4-3

Preparation of Tannin-Phenol-Formaldehyde Foam (TPFF-4-3) Using FEA-1100

A tannin-phenolic foam was made with PFR-4 using the following method. The PFR-4 resole (40.00 g) was mixed using a spatula with surfactant (2.048 g, Evonik Tegostab B8408), followed by the addition of mimosa tannin (11.900 g, SilvaTeam, 24% based on the total amount of phenol) into the mixture. Next, a foam expansion agent (4.40 g, pentane) was mixed into the mixture until a stable weight was achieved. Next, p-toluenesulfonic acid/xylenesulfonic acid (5.2 g, a 70/30 mixture dissolved in a minimum amount of ethylene glycol) was added and mixed for 1 min. A portion of the mixture was placed into a 1000 mL polypropylene bottle. The bottle and contents were placed in a 50° C. water bath for exactly 5 min. After that, the bottle and contents were placed in an oven at 50° C. for an additional 3 min, whereupon the foam began to rise. After 10 min the bottle was sealed with the polypropylene cap. The foam was left to react for 45 min. The cap was removed from the bottle and the foam was placed back in the oven overnight at 50° C. The limiting oxygen index (LOI) of the as-prepared foam, TPFF-4-3 was found to be 36.5.

Example 4-4

Preparation of Tannin-Phenol-Formaldehyde Foam (TPFF-4-4) Using FEA-1100

A tannin-phenolic foam was prepared with TPFR-5 described infra in step 5A of Example 5 and the foaming procedure explained in the Example 4-3, except the foam expansion agent was FEA 1100 (8 g, DuPont). The limiting oxygen index (LOI) of the as-prepared foam, TPFF-4-4 was found to be 39.

Example 5

Preparation of Tannin-Resole Based Foam (TPFF-5) with FEA-1100

Step 5A: Preparation of Tannin-Phenol-Formaldehyde Resole (TPFR-5)

A phenol-tannin-formaldehyde resole was prepared by reaction of phenol (74.6 g) with a 37% formaldehyde solution (142.35 g) and mimosa tannin (13.10 g, SilvaTeam, 14.94 wt % based on the total amount of phenol) in a 500 mL two-neck flask fitted with a reflux condenser and stirred using a magnetic stir bar. The pH was adjusted to 8-9 using a sodium hydroxide solution (50 wt %), at room temperature. The flask and contents were suspended in an oil bath and the temperature in the oil was raised at approximately 1.58° C. per minute until the internal temperature reached 90° C. The phenol-formaldehyde mixture was stirred for an additional 1.5 h at 90° C. The flask and contents were then allowed to cool to room temperature. The pH of the solution was adjusted to pH 6.9 using an aqueous hydrochloric acid solution (10 wt %). The product was then concentrated via rotary evaporation in an 80° C. bath to 56.74% of the original weight. The resulting resole, TPFR-5 was a viscous solution with a measured viscosity of 29.2 Pa·s at 40° C.

Step 5B: Preparation of Tannin-Phenol-Formaldehyde Foam (TPFF-5) Using FEA-1100

A tannin-phenolic foam was prepared with TPFR-5 and the foaming procedure explained in the step 4B of Example 4-1. The density of the as-prepared foam, TPFF-5 was 0.028 g/cc. The open-cell content of the foam was 32.57%, and the measured thermal conductivity was 0.035 W/m·K.

Example 6

Preparation of Tannin-Resole Based Foam (TPFF-6) with FEA-1100

Step 6A: Preparation of Tannin-Phenol-Formaldehyde Resole (TPFR-6)

A phenol-tannin-formaldehyde resole was prepared by reaction of a 37% formaldehyde solution (142.35 g) with mimosa tannin (13.1 g, 14.94 wt % based on the total amount of phenol) in a 500 mL two-neck flask fitted with a reflux condenser and stirred using a magnetic stir bar. The pH was adjusted using a sodium hydroxide solution (1.927 g, 50 wt %), at room temperature. The flask and contents were suspended in an oil bath and the temperature in the oil was raised at approximately 0.54° C./min until the internal temperature reached 80° C. The reaction was cooled down to 24° C. and then phenol (74.60 g) was added to the solution. The mixture was heated to 90° C. (0.44° C./min) and then maintained at 90° C. for an additional 3 h. The flask and contents were then allowed to cool to room temperature. The pH of the solution was adjusted to pH 6.9 using an aqueous hydrochloric acid solution (10 wt %). The product was then concentrated via rotary evaporation in an 80° C. bath to 57.15% of the original weight. The resulting resole, TPFR-6 was a viscous solution with a measured viscosity of 10 Pa·s at 40° C.

Step 6B: Preparation of Tannin-Phenol-Formaldehyde Foam (TPFF-6) Using FEA-1100

A phenolic foam was prepared using the resole TPFR-6 and the foaming procedure explained in the step 4B of Example 4-1. The density of the as-prepared foam, TPFF-6 was 0.025 g/cc, and the open-cell content of the foam was 41.10%.

Example 7

Preparation of Tannin-Resole Based Foam (TPFF-8) with FEA-1100

Step 7A: Preparation of Tannin-Phenol-Formaldehyde Resole (TPFR-7)

A phenol-tannin-formaldehyde resole was prepared by reaction of phenol (74.6 g) with a 37% formaldehyde solution (142.35 g) in a 500 mL two-neck flask fitted with a reflux condenser and stirred using a magnetic stir bar. The pH was adjusted by the addition of a sodium hydroxide solution (1.941 g, 50 wt %), at room temperature. The flask and contents were suspended in an oil bath and the temperature in the oil was raised slowly until the internal temperature reached 90° C. The phenol-formaldehyde mixture was stirred for an additional 1 h. Then, mimosa tannin (13.10 g, SilvaTeam, 14.94 wt % based on the total amount of phenol) was added to the solution. The mixture was then maintained at 90° C. for an additional 30 min. The flask and contents were then allowed to cool to room temperature. The pH of the solution was adjusted to pH 6.9 using an aqueous hydrochloric acid solution (3.108 g, 10 wt %). The product was then concentrated via rotary evaporation in an 80° C. bath to 57.38% of the original weight. The resulting resole, TPFR-7 was a very viscous mixture with a measured viscosity of 300 Pa·s at 40° C. The resole contained 55.30% phenol.

Step 7B: Preparation of Tannin-Phenol-Formaldehyde Foam (TPFF-7) Using FEA-1100

A phenolic foam was prepared using the resole, TPFR-7 described in the step 7A and the foaming procedure explained in the step 4B of Example 4-1, except that water (0.440 g, 4.2 wt % water based on resole) was blended into the mixture. The density of the as-prepared foam, TPFF-7 was 0.027 g/cc, and the open-cell content of the foam was 68.96%.

Example 8

Preparation of Tannin-Phenol-Formaldehyde Foam (TPFF-8) with FEA-1100

Step 8A: Preparation of Tannin-Phenol-Formaldehyde Resole (TPFR-8: TPFR-7+ water)

The resole from TPFR-7 (58.347 g, 34.02 g of phenol in the resole) was diluted with water (3.034 g, 4.94 wt % water based on resole).

Step 8B: Preparation of Tannin-Phenol-Formaldehyde Foam TPFF-8) Using FEA-1100

A phenolic foam was prepared using the foaming procedure explained in the step 4B of Example 4-1, except that mimosa tannin (1.78 g, 9.91 wt % based on the total amount of phenol) was blended into the mixture. The density of the as-prepared foam, TPFF-8 was 0.039 g/cc, and the open-cell content of the foam was 38.85%. The measured thermal conductivity of the foam, TPFF-8 was 0.033 W/m·K.

Example 9-1

Preparation of Tannin-Phenol-Formaldehyde Foam (TPFF-9-1) with FEA-1100

Step 9A: Preparation of Phenol-Formaldehyde Resole (PFR-9)

A phenol-formaldehyde resole was prepared by reaction of phenol (503 g) with a 37% formaldehyde solution (949.50 g) in a 2 L three-neck flask fitted with a reflux condenser and stirred using an overhead stirrer. The pH was adjusted to 8-9 using a sodium hydroxide solution (50 wt %), at room temperature. The flask and contents were suspended in an oil bath and the temperature in the oil was raised at approximately 1.6° C. per minute until the internal temperature reached 90° C. The phenol-formaldehyde mixture was stirred for an additional 1 h. The flask and contents were then allowed to cool to room temperature.

Step 9A': Preparation of Tannin-Phenol-Formaldehyde Resole PFR-9-1: Viscous PFR-9)

A portion of the basic resole solution, PFR-9 described in step 9A was placed into a 500 mL round bottom flask and was adjusted to pH 7.0 using an aqueous hydrochloric acid solution (10 wt %). The product was then concentrated via rotary evaporation in an 80° C. bath to 56.60% of the original weight. The resulting resole, PFR-9-1 contained 342.70 g (61.19%) of phenol.

Step 9B: Preparation of Tannin-Phenol-Formaldehyde Foam TPFF-9-1) Using FEA-1100

A tannin-phenolic foam was made using the resole described PFR-9-1 using the following method. A portion (12.90 g) of the resole was mixed mechanically with dried mimosa tannin (2.10 g, 21 wt % based on the total amount of phenol) and then heated in a closed container at 80° C. for 120 min. Next, Tegostab B8406 was added (0.4 g), followed by the addition of FEA 1100 (1.5 g). The mixture was stirred with mechanical mixing at 500 rpm until smooth and uniform and a small amount of FEA 1100 was added to maintain the desired weight. Next, p-toluenesulfonic acid/xylenesulfonic acid (1.4 g, a 70/30 mixture dissolved in a minimum amount of ethylene glycol) was added and mixed for 1 min. A portion of the mixture was placed into a 250 mL polypropylene bottle. The bottle and contents were placed in an oven at 80° C. for exactly 5 min, whereupon the foam began to rise. After 5 min, the bottle was sealed with the polypropylene cap. The foam was returned to the oven and allowed to react. After 45 min, the cap was removed from the bottle along with its contents was placed back in the oven at 60° C. for overnight. Additional foams were prepared and compared to TPFF-9-1. The properties of the foams: TPFF-9-1-TPFF-9-10 are summarized in the Table 1.

Example 9-2

Preparation of Tannin-Phenol-Formaldehyde Foam (TPFF-9-2) using FEA-1100

A tannin-phenolic foam was made using the procedure described in the step 9B of Example 9-1, except that 21 wt % tannin was dispersed without heating just prior to foaming. The properties of the as-prepared foam (TPFF-9-2) are summarized in the Table 1.

Example 9-3

Preparation of Tannin-Phenol-Formaldehyde Foam (TPFF-9-3) Using FEA-1100

A tannin-phenolic foam was made using the procedure described in the step 9B of Example 9-1, except that 29 wt % tannin was dispersed without heating just prior to foaming and all mixing was done by hand, except for mechanical mixing at 500 rpm after addition of acid catalyst. The properties of the as-prepared foam, TPFF-9-3 are summarized in the Table 1.

Example 9-4

Preparation of Tannin-Phenol-Formaldehyde Foam (TPFF-9-4) Using FEA-1100

A tannin-phenolic foam was made using the procedure described in the step 9B of Example 9-1, except that 41 wt % tannin was dispersed without heating just prior to foaming and all mixing was done by hand, except for mechanical mixing at 500 rpm after addition of acid catalyst. The properties of the as-prepared foam, TPFF-9-4 are summarized in the Table 1.

Example 9-5

Preparation of Tannin-Phenol-Formaldehyde Foam (TPFF-9-5) Using FEA-1100

A tannin-phenolic foam was made using the procedure described in the step 9B of Example 9-1. The properties of the as-prepared foam, TPFF-9-5 are summarized in the Table 1.

Example 9-6

Preparation of Tannin-Phenol-Formaldehyde Foam (TPFF-9-6) using FEA-1100

A tannin-phenolic foam was made using the procedure described in the step 9B of Example 9-1, except that 29 wt % of tannin was incorporated. The properties of the as-prepared foam, TPFF-9-6 are summarized in the Table 1.

Example 9-7

Preparation of Tannin-Phenol-Formaldehyde Foam (TPFF-9-7) using FEA-1100

A tannin-phenolic foam was made using the resole, PFR-9-1 described in the step 9A' of the Example 9-1 using the following method. A portion (15.0 g) of the resole, PFR-9-1 was mixed by hand using a spatula with dried mimosa tannin (2.65 g, 22 wt % based on the total amount of phenol) and surfactant (0.6 g, Evonik Tegostab 8406) into a closed container. The mixture was set aside at room temperature for 3 d. Next, a foam expansion agent (2.25 g, FEA 1100, DuPont) was added. The mixture was stirred with a spatula until smooth and uniform and a small amount of FEA 1100 was added to maintain the desired weight. Next, p-toluenesulfonic acid/xylenesulfonic acid (2.10 g, a 70/30 mixture dissolved in a minimum amount of ethylene glycol) was added and mixed for 1 min. A portion of the mixture was placed into a 250 mL polypropylene bottle. The bottle and contents were placed in an oven at 80° C. for exactly 5 min, whereupon the foam began to rise. After 5 min, the bottle was sealed with the polypropylene cap and the bottle was returned to the oven and allowed to react. After 45 min, the cap was removed from the bottle and the bottle along with its contents was placed back in the oven at 60° C. for overnight. The properties of the as-prepared foam, TPFF-9-7 are summarized in the Table 1.

Example 9-8

Preparation of Tannin-Phenol-Formaldehyde Foam (TPFF-9-8) Using FEA-1100

Same procedure as used for TPFF-9-7 above was used, except 3.75 g tannin was added. The properties of the as-prepared foam, TPFF-9-8 are summarized in the Table 1.

Example 9-9

Preparation of Tannin-Phenol-Formaldehyde Foam (TPFF-9-9) Using FEA-1100

Same procedure as used for TPFF-9-7 was used, except tannin was dispersed immediately and not allowed to sit for 3 d. The properties of the as-prepared foam, TPFF-9-9 are summarized in the Table 1.

Example 9-10

Preparation of Tannin-Phenol-Formaldehyde Foam (TPFF-9-10) Using FEA-1100

Same procedure as used for TPFF-9-8 was used, except tannin was dispersed immediately and not allowed to sit for 3 d. The properties of the as-prepared foam, TPFF-9-10 are summarized in the Table 1.

TABLE 1

| Example | Extra Tannin (wt %) | Density (g/cc) | Open-cell (%) |
|---|---|---|---|
| TPFF-9-1 | 21 | 0.038 | 27.80 |
| TPFF-9-2 | 21 | 0.030 | 25.33 |

TABLE 1-continued

| Example | Extra Tannin (wt %) | Density (g/cc) | Open-cell (%) |
|---|---|---|---|
| TPFF-9-3 | 29 | 0.030 | 34.21 |
| TPFF-9-4 | 41 | 0.033 | 32.94 |
| TPFF-9-5 | 21 | 0.030 | 45.24 |
| TPFF-9-6 | 29 | 0.033 | 25.90 |
| TPFF-9-7 | 22 | 0.030 | 32.65 |
| TPFF-9-8 | 29 | 0.033 | 32.31 |
| TPFF-9-9 | 22 | 0.032 | 40.55 |
| TPFF-9-10 | 29 | 0.033 | 50.68 |

Example 10

Preparation of Tannin-Phenol-Formaldehyde Foam (TPFF-10) with FEA-1100

Step 10A: Preparation of Tannin-Phenol-Formaldehyde Resole (PFR-10: PFR-9-1+ tannin)

A portion (252.27 g) of the basic resole solution, PFR-9-1 described in the step 9A' of Example 9-1 was placed into a 500 mL round bottom flask and then dried tannin (23.54 g) was added to the basic solution. The mixture was stirred at room temperature for 2.5 h until the mixture had become a very dark brown and uniform solution. The pH of the resulting solution was 7.0. The solution was then concentrated via rotary evaporation in an 80° C. bath to 56.47% of the original weight. The calculated amount of tannin was 21 wt % based on the total amount of phenol.

Step 10B: Preparation of Tannin-Phenol-Formaldehyde Foam (TPFF-10) Using FEA-1100

A tannin-phenolic foam was made using the resole, PFR-10 using the following method. A portion (15.0 g) of the resole, PFR-10 was mixed mechanically with surfactant (0.4 g. Evonik Tegostab 8406), followed by the addition of a foam expansion agent (1.5 g, FEA 1100, DuPont). The mixture was stirred with a spatula until smooth and uniform and a small amount of FEA 1100 was added to maintain the desired weight. Next, p-toluenesulfonic acid/xylenesulfonic acid (1.40 g, a 70/30 mixture dissolved in a minimum amount of ethylene glycol) was added and mixed for 1 min. A portion of the mixture was placed into a 250 mL polypropylene bottle. The bottle and contents were placed in an oven at 80° C. for exactly 5 min, whereupon the foam began to rise. After 5 min, the bottle was sealed with the polypropylene cap. The foam was returned to the oven and allowed to react for 45 min. The cap was removed from the bottle along with its contents was placed back in the oven overnight at 60° C. The density of the as-prepared foam, TPFF-10 was 0.033 g/cc and the open-cell content of the foam was 35.66%.

Example 11

Preparation of Tannin-Phenol-Formaldehyde Foam (TPFF-11) with FEA-1100

Step 11A: Preparation of Phenol-Formaldehyde Resole (PFR-11)

A phenol-formaldehyde resole was prepared by reaction of phenol (507 g) with a 37% formaldehyde solution (961.92 g) in a 2 L three-neck flask fitted with a reflux condenser and stirred using an overhead stirrer. The pH was adjusted to 8-9 using a sodium hydroxide solution (50 wt %), at room temperature. The flask and contents were suspended in an oil bath and the temperature in the oil was raised at approximately 1.48° C./min until the internal temperature reached 90° C. The phenol-formaldehyde mixture was stirred for an additional 126 min. The flask and contents were then allowed to cool to room temperature.

Step 11A': Preparation of Phenol-Formaldehyde Resole (PFR-11-1: Viscous PFR-11)

A portion of the basic resole solution, PFR-11 described in the step 11A was placed into a 500 mL round bottom flask and was adjusted to pH 7.0 using a hydrochloric acid solution (10 wt %). The product was then concentrated via rotary evaporation in an 80° C. bath to 58.30% of the original weight. The resulting resole, PFR-1'-1 contained 58.90% (139.18 g) phenol.

Step 11B: Preparation of Tannin-Phenol-Formaldehyde Foam (TPFF-11) Using FEA-1100

A tannin-phenolic foam was made using the resole, PFR-11-1 described above in step 11A using the following method. A portion (10.0 g) of the resole, PFR-11-1 was mixed mechanically with Tegostab B8406 (0.4 g) and dried mimosa tannin (1.15 g, 16.34 wt % based on the total amount of phenol), followed by the addition of FEA-1100 (1.5 g). The mixture was stirred with a spatula until smooth and uniform and a small amount of FEA-1100 was added to maintain the desired weight. Next, p-toluenesulfonic acid/xylenesulfonic acid (1.40 g, a 70/30 mixture dissolved in a minimum amount of ethylene glycol) was added and mixed for 1 min. A portion of the mixture was placed into a 250 mL polypropylene bottle. The bottle and contents were placed in an oven at 80° C. for 5 min, whereupon the foam began to rise. After 5 min, the bottle was sealed with the polypropylene cap. The foam was returned to the oven and allowed to react. After 45 min, the cap was removed from the bottle and the bottle along with its contents was placed back in the oven at 60° C. for overnight. The density of the as-prepared foam, TPFF-11 was 0.036 g/cc and the open-cell content of the foam was 17.49%.

Example 12-1

Preparation of Tannin-Phenol-Formaldehyde Foam (TPFF-12-1) with FEA-1100

Step 12A: Preparation of Tannin-Phenol-Formaldehyde Resole (TPFR-12: PFR-10+ tannin)

A 250 mL round bottom flask with a magnetic stir bar was charged with PFR-10 and dried mimosa tannin (20.00 g). The pH of the resole at 21.3° C. prior to the addition of tannin was 7.3. After 2 h of stirring at room temperature the mixture was very dark, but some solids were still visible to the eye and the pH 7.0. The mixture was stirred for an additional 19 h. Under 10× magnification, there were still some very small tannin particles visible in the mixture and the pH 6.7. This solution was then concentrated via rotary evaporation in an 80° C. bath to 60.93% of the original weight. The resole, PFR-10 contained 48.37 wt % (68.26 g) phenol. The percent tannin in the mixture, TPFR-12 was 22.66 wt % based on the total amount of phenol.

Step 12B: Preparation of
Tannin-Phenol-Formaldehyde Foam (TPFF-12-1)
Using FEA-1100

A tannin-phenolic foam was made with TPFR-12 using the following method. A portion (10.0 g) of the resole, TPFR-12 was mixed mechanically with Tegostab B8406 (0.4 g), followed by the addition of FEA-1100 (1.5 g). The mixture was stirred with a spatula until smooth and uniform and a small amount of FEA-1100 was added to maintain the desired weight. Next, p-toluenesulfonic acid/xylenesulfonic acid (1.40 g, a 70/30 mixture dissolved in a minimum amount of ethylene glycol) was added and mixed for 1 min. A portion of the mixture was placed into a 250 mL polypropylene bottle. The bottle and contents were placed in an oven at 80° C. for 5 min, whereupon the foam began to rise. After 5 min, the bottle was sealed with the polypropylene cap and the foam was left to react. After 45 min, the cap was removed from the bottle and the foam was placed back in the oven overnight at 60° C. The density of the as-prepared foam, TPFF-12 was 0.034 g/cc. The open-cell content of the foam was 15.86%.

Example 12-2

Preparation of Tannin-Phenol-Formaldehyde Foam
(TPFF-12-2) Using FEA-1100

A phenolic foam was made using the procedure described in the step 12B of Example 12-1, except that 1.60 g of p-toluenesulfonic acid/xylenesulfonic acid (a 70/30 mixture dissolved in a minimum amount of ethylene glycol) was added. The density of the as-prepared foam, TPFF-12-2 was 0.035 g/cc. The open-cell content of the foam was 13.30%.

Example 12-3

Preparation of Tannin-Phenol-Formaldehyde Foam
(TPFF-12-3) Using FEA-1100

A phenolic foam was made using the procedure described in the step 12B of Example 12-1, except that 1.80 g of p-toluenesulfonic acid/xylenesulfonic acid (a 70/30 mixture dissolved in a minimum amount of ethylene glycol) was added. The density of the as-prepared foam, TPFF-12-3 was 0.036 g/cc. The open-cell content of the foam was 12.80%.

Example 12-4

Preparation of Tannin-Phenol-Formaldehyde Foam
(TPFF-12-4) Using FEA-1100

A phenolic foam was made using the procedure described in the step 12B of Example 12-1, except that 2.00 g of p-toluenesulfonic acid/xylenesulfonic acid (a 70/30 mixture dissolved in a minimum amount of ethylene glycol) was added. The density of the as-prepared foam, TPFF-12-4 was 0.034 g/cc. The open-cell content of the foam was 13.92%.

Example 13

Preparation of Tannin-Resole Based Foam
(TPFF-13) with FEA-1100

Mimosa tannin was dried at 100° C. for 2 days before use. Furfuryl alcohol (7.2 g), 37% formaldehyde solution (2.0 g), water (4 g), and Tegostab 8406 (1 g) was mixed and added to the mimosa tannin (20 g). The mixture was stirred with a spatula. The sample was stirred three times and the mixture left at room temperature overnight. A portion (7.2 g) of the above mixture was removed and mixed with the resole PFR-11-1 (7.1 g), prepared in the step 11A', followed by the addition and mixing of a further 0.25 g of Tegostab B8406 and then followed by the addition of FEA-1100 (2.4 g) that was mixed into the mixture until a stable weight was achieved. Next, p-toluenesulfonic acid/xylenesulfonic acid (2.5 g, a 70/30 mixture dissolved in a minimum amount of ethylene glycol) was added and mixed for 1 min. The material was transferred to a 250 mL polypropylene bottle and placed in an oven at 50° C. with the cap off. After 3 min, the cap was placed on and the bottle and contents were left at 50° C. After three days the cap was removed and the uncapped bottle was left at 50° C. for an additional 1 day to remove any volatiles. The density of the as-prepared foam, TPFF-13 was 0.051 g/cc, and the open-cell content of the foam was 6.96%. The measured thermal conductivity was 0.022 W/m·K.

Example 14

Preparation of Tannin-Resole Based Foam
(TPFF-14) with n-pentane

Mimosa tannin was dried at 100° C. for 2 days before use. Furfuryl alcohol (7.2 g), 37% formaldehyde solution (2.0 g), water (6 g), and Tegostab B8406 (1 g) was mixed and added to mimosa tannin (20 g). The mixture was stirred with a spatula. The sample was stirred about three times and the mixture left at room temperature overnight. A portion (12 g) of the above mixture was removed and mixed with the resole PFR-11-1 (11 g), prepared in the step 11A', followed by the addition and mixing of a further 0.3 g of Tegostab B8406 and then followed by the addition of n-pentane (1.3 g) that was mixed into the mixture until a stable weight was achieved. Next, p-toluenesulfonic acid/xylenesulfonic acid (2 g, a 70/30 mixture dissolved in a minimum amount of ethylene glycol) was added and mixed for 1 min. The material was transferred to a 250 mL polypropylene bottle and placed in an oven at 50° C. with the cap off. After 3 min in the oven, the cap was placed on and the bottle and contents were left at 50° C. After three days, the cap was removed and the uncapped bottle was left at 50° C. for an additional 1 day to remove any volatiles, leading to essentially a closed-cell foam, TPFF-14.

Example 15-1

Preparation of Tannin-Phenol-Formaldehyde Foam
(TPFF-15) Using FEA-1100

Step 15A: Preparation of
Tannin-Phenol-Formaldehyde Resole (TPFR-15)

A phenol-formaldehyde resole was prepared by reaction of phenol (187.65 g) with a 37% formaldehyde solution (356.02 g) in a 2 L three-neck flask fitted with a reflux condenser and stirred using an overhead stirrer. The pH was adjusted to 8-9 using a sodium hydroxide solution (50 wt %), at room temperature. The flask and contents were suspended in an oil bath and the temperature in the oil was raised at approximately 1.2° C. per minute until the internal temperature reached 90° C. The phenol-formaldehyde mixture was then maintained at 90° C. for an additional 3 h. The reaction solution was then cooled in an ice bath to room temperature. The pH was adjusted to 8.0 by the addition of sodium hydroxide solution (50 wt %). Dried mimosa tannin (60.09 g) was added to the reaction solution. The mixture was allowed to stir at room temperature overnight. This solution was then concentrated via rotary evaporation in an 80° C. bath. The calculated amount of tannin to phenol was 24.25 wt %. The concentrated resulting resole, TPFR-15 contained 45.27 wt % of phenol based on total content.

Step 15B: Preparation of
Tannin-Phenol-Formaldehyde Foam (TPFF-15-1)
Using FEA-1100

A tannin-phenolic foam was made with TPFR-15 using the following method. A portion (40.0 g) of the resole was mixed mechanically at 650 rpm with Tegostab B8406 (1.6 g), followed by the addition of FEA-1100 (6.0 g). The mixture was stirred with a spatula until smooth and uniform and a small amount of FEA-1100 was added to maintain the desired weight. Next, p-toluenesulfonic acid/xylenesulfonic acid (5.6 g, a 70130 mixture dissolved in a minimum amount of ethylene glycol) was added and mixed for 1 min. A portion of the mixture was placed into a 1 L polypropylene bottle. The bottle and contents were placed in an oven at 80° C. for exactly 5 min, whereupon the foam began to rise. After 5 min, the bottle was sealed with the polypropylene cap. The foam was left to react for 45 min. The cap was removed from the bottle and the bottle was placed back in the oven at 60° C. for overnight. The limiting oxygen index (LOI) of the as-prepared foam, TPFF-15-1 was found to be 35.5.

Example 15-2

Preparation of Tannin-Phenol-Formaldehyde Foam
(TPFF-15-2) Using FEA-1100

A tannin-phenolic foam was prepared using the foaming procedure explained in the step 15B of Example 15-1, except the foam was hand mixed and the foam was placed in the oven overnight at 50° C. The limiting oxygen index (LOI) of the as-prepared foam, TPFF-15-2 was found to be 36.

Example 6-1

Preparation of Tannin-Phenol-Formaldehyde Foam
(TPFF-16-1) with Pentane

Step 16A: Preparation of Phenol-Formaldehyde
Resole (PFR-16)

A phenol-formaldehyde resole was prepared by reaction of phenol (375.3 g) with a 37% formaldehyde solution (712.05 g) in a 2 L three-neck flask fitted with a reflux condenser and stirred with an overhead stirrer. The pH was adjusted to 8-9 using a sodium hydroxide solution (50 wt %), at room temperature. The flask and contents were suspended in an oil bath and the temperature in the oil was raised at approximately 1.3° C. per minute until the internal temperature reached 90° C. The phenol-formaldehyde mixture was stirred for an additional 3 h at 90° C. The flask and contents were then allowed to cool to room temperature. The pH of the solution was adjusted to pH 7.0 using an aqueous hydrochloric acid solution (10 wt %). The product was then concentrated via rotary evaporation in an 80° C. bath to 57.06% of the original weight.

Step 16B: Preparation of Tannin-Resole Based Foam
(TPFF-16-1) with Pentane

Mimosa tannin was dried at 100° C. for 2 days before use, Furfuryl alcohol (7.2 g), 37% formaldehyde solution (2.0 g), water (6 g), and Tegostab B8406 (1 g) was mixed and added to the mimosa tannin (20 g). The mixture was stirred with a spatula. The sample was stirred three times and the mixture left at room temperature for one day. A portion (15 g) of the above mixture was removed and mixed with the resole PFR-16 (5.27 g) followed by the addition and mixing of a further 0.23 g of Tegostab B8406 and then followed by the addition of pentane (1.57 g) that was mixed into the mixture until a stable weight was achieved. Next, p-toluenesulfonic acid/xylenesulfonic acid (2 g, a 70/30 mixture dissolved in a minimum amount of ethylene glycol) was added and mixed for 2 min. The material was transferred to a 250 mL polypropylene bottle and placed in an oven at 50° C. with the cap off. After 4 min in the oven, the cap was placed on and the bottle and contents were left at 50° C. for overnight. The cap was removed and the uncapped bottle was left at 50° C. for an additional 1 day to remove any volatiles. The density of the as-prepared foam, TPFF-16-1 was 0.038 g/cc, and the open-cell content of the foam was 6.75%. The measured thermal conductivity of the foam, TPFF-16-1 was 0.026 W/m·K.

Example 16-2

Preparation of Tannin-Phenol-Formaldehyde Foam
(TPFF-16-2) with FEA-1100

Mimosa tannin was dried at 100° C. for 2 days before use. Furfuryl alcohol (7.2 g), 37% formaldehyde solution (2.0 g), water (4 g), and Tegostab B8406 (1 g) was mixed and added to the mimosa tannin (20 g). The mixture was stirred with a spatula. The sample was stirred three times and the mixture left at room temperature overnight. A portion (30 g) of the above mixture was removed and mixed with the resole PFR-16 (20 g) followed by the addition and mixing of a further 0.75 g of Tegostab B8406 and then followed by the addition of FEA-1100 (2.7 g) that was mixed into the mixture until a stable weight was achieved. Next, p-toluenesulfonic acid/xylenesulfonic acid (1.5 g, a 70/30 mixture dissolved in a minimum amount of ethylene glycol) was added and mixed for 1 min. The material was transferred to a 250 mL polypropylene bottle and placed in an oven at 50° C. with the cap off. After 4 min in the oven, the cap was placed on and the bottle and contents were left at 50° C. for overnight. The cap was removed and the uncapped bottle was left at 50° C. for an additional 1 day to remove any volatiles. The density of the as-prepared foam, TPFF-16-2 was 0.041 g/cc, and the open-cell content of the foam was 10.84%. The measured thermal conductivity of the foam, TPFF-16-3 was 0.0237 W/m·K.

Example 16-3

Preparation of Tannin-Phenol-Formaldehyde Foam
(TPFF-16-3) with Pentane

Mimosa tannin was dried at 100° C. for 2 days before use. Furfuryl alcohol (7.2 g), 37% formaldehyde solution (2.0 g), water (6 g), and Tegostab B8406 (1 g) was mixed and added to the mimosa tannin (20 g). The mixture was stirred with a spatula. The sample was stirred three times and the mixture left at room temperature overnight. A portion (12 g) of the above mixture was removed and mixed with the resole PFR-16 (11 g) followed by the addition and mixing of a further 0.35 g of Tegostab B8406 and then followed by the addition of pentane (1.35 g) that was mixed into the mixture until a stable weight was achieved. Next, p-toluenesulfonic acid/xylenesulfonic acid (2 g, a 70/30 mixture dissolved in a minimum amount of ethylene glycol) was added and mixed for 2 min. The material was transferred to a 250 mL polypropylene bottle and placed in an oven at 50° C. with the cap off. After 4 min in the oven, the cap was placed on the bathe and the bottle along with its contents was left at 50° C. for overnight. The cap was removed and the uncapped bottle was left at 50° C. for an additional 1 day to remove any volatiles. The density of the as-prepared foam, TPFF-16-3 was 0.041 g/cc, and the open-cell content of the foam was 10.84%. The measured thermal conductivity of the foam, TPFF-16-3 was 0.029 W/m·K.

Example 16-4

Preparation of Tannin-Phenol-Formaldehyde Foam (TPFF-16-4) with FEA-1100

Mimosa tannin was dried at 100° C. for 2 days before use. Furfuryl alcohol (7.2 g), 37% formaldehyde solution (2.0 g), water (6 g), and Tegostab B8406 (1 g) was mixed and added to the mimosa tannin (20 g). The mixture was stirred with a spatula. The sample was stirred three times and the mixture left at room temperature overnight. A portion (10 g) of the above mixture was removed and mixed with the resole PFR-16 (10 g) followed by the addition and mixing of a further 0.35 g of Tegostab B8406 and then followed by the addition of FEA-1100 (2.6 g) that was mixed into the mixture until a stable weight was achieved. Next, p-toluenesulfonic acid/xylenesulfonic acid (1.8 g, a 70/30 mixture dissolved in a minimum amount of ethylene glycol) was added and mixed for 1 min. The material was transferred to a 250 mL polypropylene bottle and placed in an oven at 50° C. with the cap off. After 6 min in the oven, the cap was placed on and the bottle and contents were left at 50° C. for overnight. The cap was removed and the uncapped bottle was left at 50° C. for an additional 1 day to remove any volatiles. The density of the as-prepared foam, TPFF-16-4 was 0.06 g/cc, and the open-cell content of the foam was 11%. The measured thermal conductivity of the foam, TPFF-16-4 was 0.025 W/m·K.

Example 17-1

Preparation of Tannin-Phenol-Formaldehyde Foam (TPFF-17-1) Using FEA-1100

Step 17A: Preparation of Phenol-Formaldehyde Resole (PFR-17)

A phenol-formaldehyde resole was prepared by reaction of phenol (375.3 g) with a 37% formaldehyde solution (712.05 g) in a 2 L three-neck flask fitted with a reflux condenser and stirred with an overhead stirrer. The pH was adjusted to 8-9 using a sodium hydroxide solution (50 wt %), at room temperature. The flask and contents were suspended in an oil bath and the temperature in the oil was raised at approximately 1.2° C. per minute until the internal temperature reached 90° C. The phenol-formaldehyde mixture was stirred for an additional 3 h at 90° C. The flask and contents were then allowed to cool to room temperature. The pH of the solution was adjusted to pH 7.0 using an aqueous hydrochloric acid solution (10 wt %). The product was then concentrated via rotary evaporation in an 80° C. bath to 59.68% of the original weight.

A plastic bottle was charged with 121.185 g of PFR-17 and 13.503 g (10 wt %) of furfuryl alcohol. The mixture was stirred mechanically for 10 minutes. This solution was used to prepare foams as described below.

Step 17B: Preparation of Tannin-Phenol-Formaldehyde Foam (TPFF-17-1) Using FEA-1100

A phenolic-tannin foam was made with PFR-17 using the following method. A portion of the resole containing 10 wt % furfuryl alcohol (12.0 g) was mixed by hand with surfactant Tegostab 8406 (0.56 g), followed by the addition of dried Mimosa tannin (2.00 g) and, FEA 1100 (2.1 g). The mixture was stirred with a spatula until smooth and uniform and a small amount of FEA-1100 was added to maintain the desired weight. Next, p-toluenesulfonic acid/xylene sulfonic acid (1.96 g, a 70/30 mixture dissolved in a minimum of ethylene glycol) was added and mixed well for 1 min. A portion of the mixture was placed into a 250 mL polypropylene bottle. The bottle and contents were placed in an oven at 50° C. for exactly 5 min, whereupon the foam began to rise. After 5 min, the bottle was sealed with the polypropylene cap. The foam was left to react for 45 min. The cap was removed from the bottle and the foam was placed back in the oven 15-18 h at 50° C. The properties of the as-prepared foam, TPFF-17-1 are summarized in the Table 3.

Example 17-2-17-8

Preparation of Tannin-Phenol-Formaldehyde Foams (TPFF-17-2-TPFF-17-8) Using FEA-1100

Various tannin-phenolic foams (TPFF-17-2-TPFF-17-8) were made with PFR-17 using the method described for TPFF-19A in the step 17B of Example 17-1, with different amounts of materials (tannin, surfactant, catalyst, and blowing agent) used are given in the Table 2. Table 3 summarizes the properties of the foams (TPFF-17-1-TPFF-17-8).

TABLE 2

Materials used in the preparation of Tannin-Formaldehyde Foams TPFF-17-1-TPFF-17-8

| Example | Tannin Type | Tannin (g) | Surfactant (g) | Catalyst (g) | FEA-1100 (g) |
|---|---|---|---|---|---|
| TPFF-17-1 | Mimosa | 2 | 0.56 | 1.96 | 2.1 |
| TPFF-17-2 | Tupafin | 2 | 0.56 | 1.4 | 2.1 |
| TPFF-17-3 | Mimosa | 3 | 0.6 | 1.4 | 2.25 |
| TPFF-17-4 | Tupafin | 3 | 0.6 | 1.4 | 2.25 |
| TPFF-17-5 | Mimosa | 4.3 | 0.652 | 1.4 | 2.445 |
| TPFF-17-6 | Tupafin | 4.3 | 0.652 | 1.4 | 2.445 |
| TPFF-17-7 | Mimosa | 2 | 0.56 | 1.4 | 2.1 |
| TPFF-17-8 | Mimosa | 6.445 | 0.738 | 1.4 | 2.767 |

TABLE 3

Properties of the Tannin-Formaldehyde Foams TPFF-17-1-TPFF-17-8

| Example | Tannin Type | Apparent Density | Thermal Conductivity (W/m · K) | % Open Cell |
|---|---|---|---|---|
| TPFF-17-1 | Mimosa | 0.0378 | 0.031 | 10.41% |
| TPFF-17-2 | Tupafin | 0.0412 | 0.031 | 5.47% |
| TPFF-17-3 | Mimosa | 0.0414 | 0.029 | 26.82% |
| TPFF-17-4 | Tupafin | 0.0439 | 0.026 | 10.69% |
| TPFF-17-5 | Mimosa | 0.0425 | 0.026 | 13.81% |
| TPFF-17-6 | Tupafin | 0.0443 | 0.022 | 11.19% |
| TPFF-17-7 | Mimosa | 0.0426 | 0.027 | 17.80% |
| TPFF-17-8 | Mimosa | 0.0434 | 0.026 | 18.00% |

Example 18-1

Preparation of Tannin-Phenol-Formaldehyde Foam (TPFF-18-1) with FEA 1100

Step 18A: Preparation of Phenol-Formaldehyde Resole (PFR-18)

A phenol-formaldehyde resole was prepared by reaction of phenol (376.44 g) with a 37% formaldehyde solution (712.23 g) in a 2 L three-neck flask fitted with a reflux condenser and stirred with an overhead stirrer. The pH was adjusted to 8-9 using a sodium hydroxide solution (50 wt %), at room temperature. The flask and contents were suspended in an oil bath and the temperature in the oil was raised at approximately 0.92° C. per minute until the internal temperature reached 90° C. The phenol-formaldehyde mixture was stirred for an additional 150 min at 90° C. The flask and contents were then allowed to cool to room temperature. The pH of the solution was adjusted to pH 7.47 using an aqueous hydrochloric acid solution (10 wt %). The product was then concentrated via rotary evaporation in an 80° C. bath to 56.50% of the original weight.

Step 18B: Preparation of Tannin-Resole Based Foam (TPFF-18-1) with FEA 1100

Mimosa tannin was dried at 100° C. for 2 days before use. Furfuryl alcohol (200 g), water (40 g) and Tegostab B8406 (20 g), were added to the dried tannin (380 g) in a 1 L reaction kettle fitted with a twin impeller stirrer blade. The mixture was stirred overnight at 75° C. and then the mixture was allowed to cool to room temperature. A portion (30 g) of the above mixture was removed and mixed with the resole PFR-18 (30 g) in a 100 mL plastic beaker, followed by the addition and mixing of a further 0.35 g of Tegostab B8406 and then followed by the addition of FEA-1100 (10 g) that was mixed into the mixture until a stable weight was achieved. The contents of the beaker were mixed using a helical shaped mixing head connected to an overhead stirrer set to 300 rpm. Weight of the foaming agent was checked in intervals of two minutes and FEA-1100 was added as needed until the weight of FEA-1100 became stable at 9.3 g. The beaker with the contents and a 20 mL scintillation vial filled with p-toluenesulfonic acid/xylenesulfonic acid, a 70/30 mixture dissolved in a minimum amount of ethylene glycol were placed on an ice bath for 10 min. Next, chilled p-toluenesulfonic acid/xylenesulfonic acid (6.0 g, a 70/30 mixture dissolved in a minimum amount of ethylene glycol) was dispensed into the chilled beaker and mixed for 30 sec. The material (19.3 g) from the chilled beaker was transferred to a 3"×3"×2" cardboard box which was placed in a pre-heated metal mold at 50° C. A pressure of 2 psi from a nitrogen line was applied inside the mold before being placed into an oven at 50° C. After 30 min the pressure was turned off and the cardboard box was removed from the metal mold. The set foam was allowed to cure at 50° C. for overnight. The open cell content of the as-prepared foam, TPFF-18-1 was 10.77% and the thermal conductivity was 0.0209 W/mK.

Example 18-2

Preparation of Tannin-Phenol-Formaldehyde Foam (TPFF-18-2) with Pentane

Mimosa tannin was dried at 100° C. for 2 days before use. Furfuryl alcohol (200 g), water (40 g) and Tegostab B8406 (20 g) were added to the dried tannin (380 g) in a 1 L reaction kettle fitted with a twin impeller stirrer blade. The mixture was stirred overnight at 75° C. and then the mixture was allowed to cool to room temperature. A portion (30 g) of the above mixture was removed and mixed with the resole PFR-18 (30 g) in a 100 mL plastic beaker, followed by the addition of pentane (10 g). The contents of the beaker were mixed using a helical shaped mixing head connected to an overhead stirrer set to 300 rpm. Weight of the foaming agent, pentane was checked in intervals of 2 min and pentane was added as needed until the weight of pentane became stable at 9.3 g. The beaker with the contents and a 20 mL scintillation vial filled with p-toluenesulfonic acid/xylenesulfonic acid, a 70/30 mixture dissolved in a minimum amount of ethylene glycol were placed on an ice bath for 10 min. Next, chilled p-toluenesulfonic acid/xylenesulfonic acid (6.0 g, a 70/30 mixture dissolved in a minimum amount of ethylene glycol) was dispensed into the chilled beaker and mixed for 30 sec. The material (10.01 g) from the chilled beaker was transferred to a 3"×3"×2" cardboard box which was placed in a pre-heated metal mold at 50° C. A pressure of 2 psi from a nitrogen line was applied inside the mold before being placed into an oven at 50° C. After 30 min the pressure was turned off and the cardboard box was removed from the metal mold. The set foam was allowed to cure at 50° C. for overnight. The open cell content of the as-prepared foam, TPFF-18-2 was 12.65% and the thermal conductivity was 00.0218 W/mK.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense and all such modifications are intended to be included within the scope of invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:
1. A foam comprising:
   (a) a continuous polymeric phase defining a plurality of cells, wherein:
   the continuous polymeric phase comprises a mixed-resin derived from a tannin, furfuryl alcohol, and a phenolic resole, wherein the phenolic resole is derived from a phenol and one or more of formaldehyde, paraformaldehyde, furfural, glyoxal, acetaldehyde, 5-hydroxymethylfurfural, 5-furandicarboxylic aldehyde, and difurfural (DFF) as a first monomer, and
   the plurality of cells comprises a plurality of open-cells and a plurality of closed-cells with an open-cell content measured according to ASTM D2856, of less than 50%; and
   b) one or more blowing agents disposed in at least a portion of the plurality of closed-cells.
2. The foam of claim 1, wherein the phenol, the tannin, and the first monomer are present in a weight ratio of 1:0.05:0.3 to 1:3:3.
3. The foam of claim 1, wherein the mixed-resin further comprises a second monomer comprising one or more of acrolein, levulinate esters, sugars, 2,5-furandicarboxylic acid, urea, glycerol, sorbitol, and lignin.

4. The foam of claim 3, wherein the phenol, urea, and the first monomer are present in a weight ratio of 1:0.05:0.3 to 1:0.008:3.

5. The foam of claim 1, wherein the open-cell content measured according to ASTM D6226-5, is less than 40%.

6. The foam of claim 1, wherein the foam has a density in the range of 10-500 kg/m$^3$.

7. The foam of claim 1, wherein at least one of the one or more blowing agents has a gas phase thermal conductivity of less than or equal to 0.016 W/m·K at 25° C.

8. The foam of claim 1, wherein at least one of the one or more blowing agents comprises 1,1,1,4,4,4-hexafluoro-2-butene.

9. The foam of claim 1, wherein the foam has a thermal conductivity in the range of 0.015-0.050 W/m·K.

10. The foam of claim 1, wherein the tannin is derived from mimosa, acacia, quebracho, pine, spruce, fir, tanoak, oak, birch, maple, eucalyptus, tara, catechu, or mixtures thereof.

11. The foam of claim 1, wherein the foam has a limiting oxygen index of at least 23, measured according to ASTM-D2863.

12. The foam of claim 1, wherein at least one the phenolic resole, the tannin or the mixed-resin comprises an additive.

13. The foam of claim 12, wherein the additive comprises cellulose fiber, bacterial cellulose, sisal fiber, clays, Kaolin-type clay, mica, vermiculite, sepiolite, hydrotalcite and other inorganic platelet materials, glass fibers, polymeric fibers, alumina fibers, aluminosilicate fibers, carbon fibers, carbon nanofibers, poly-1,3-glucan, lyocel fibers, chitosan, boehmite (AlO.OH), zirconium oxide, a polyester polyol, or mixtures thereof.

14. An article comprising the foam of claim 1.

15. The article of claim 14 comprising a sandwich panel structure, wherein the sandwich panel structure comprises the foam disposed between two similar or dissimilar non-foam materials.

* * * * *